(12) United States Patent
Sung et al.

(10) Patent No.: US 12,508,575 B2
(45) Date of Patent: Dec. 30, 2025

(54) YTTRIUM-DOPED CATALYST SUPPORT

(71) Applicant: BASF MOBILE EMISSIONS CATALYSTS LLC, Iselin, NJ (US)

(72) Inventors: Shiang Sung, Iselin, NJ (US); Markus Koegel, Heidelberg (DE); Sven Jare Lohmeier, Hannover (DE)

(73) Assignee: BASF Mobile Emissions Catalysts LLC, Iselin, NJ (US)

( * ) Notice: Subject to any disclaimer, the term of this patent is extended or adjusted under 35 U.S.C. 154(b) by 539 days.

(21) Appl. No.: 17/758,718

(22) PCT Filed: Jan. 26, 2021

(86) PCT No.: PCT/US2021/015046
§ 371 (c)(1),
(2) Date: Jul. 13, 2022

(87) PCT Pub. No.: WO2021/154701
PCT Pub. Date: Aug. 5, 2021

(65) Prior Publication Data
US 2023/0330634 A1    Oct. 19, 2023

Related U.S. Application Data

(60) Provisional application No. 62/966,167, filed on Jan. 27, 2020.

(51) Int. Cl.
*B01J 21/04*    (2006.01)
*B01D 53/94*    (2006.01)
(Continued)

(52) U.S. Cl.
CPC ............ *B01J 23/10* (2013.01); *B01D 53/944* (2013.01); *B01D 53/9486* (2013.01);
(Continued)

(58) Field of Classification Search
CPC ........ B01J 21/04; B01J 21/063; B01J 21/066; B01J 21/08; B01J 23/10; B01J 23/34; B01J 23/42; B01D 53/944; B01D 53/9486
(Continued)

(56) References Cited

U.S. PATENT DOCUMENTS 6,107,239 A    8/2000  Qin et al.
9,533,295 B2 *  1/2017  Müller-Stach et al. .....................
                                                        B01J 29/7615
(Continued)

FOREIGN PATENT DOCUMENTS

CN    103370131 A    10/2013
CN    105916580 A    8/2016
(Continued)

OTHER PUBLICATIONS

International Search Report dated May 21, 2021, PCT/US2021/015046.
(Continued)

*Primary Examiner* — Cam N. Nguyen
(74) *Attorney, Agent, or Firm* — DLA Piper LLP (US)

(57) ABSTRACT

Disclosed herein are oxidation catalyst compositions comprising a first platinum group metal (PGM) component, a manganese (Mn) component, a first refractory metal oxide support material, and a metal component comprising yttrium, lanthanum, tin, magnesium, cerium, titanium, or a combination of any of the foregoing, wherein each of the first PGM component, the Mn component, and the metal component are supported on the first refractory metal oxide support material; catalyst articles coated with at least one such catalyst composition; and emission treatment systems including at least one such catalyst article.

31 Claims, 10 Drawing Sheets

(51) Int. Cl.

| | |
|---|---|
| *B01J 21/08* | (2006.01) |
| *B01J 21/12* | (2006.01) |
| *B01J 23/10* | (2006.01) |
| *B01J 23/34* | (2006.01) |
| *B01J 23/42* | (2006.01) |
| *B01J 23/44* | (2006.01) |
| *B01J 29/70* | (2006.01) |
| *B01J 35/00* | (2006.01) |
| *B01J 37/03* | (2006.01) |

(52) U.S. Cl.
CPC ............... *B01J 21/04* (2013.01); *B01J 23/34* (2013.01); *B01J 23/42* (2013.01); *B01J 23/44* (2013.01); *B01J 29/7007* (2013.01); *B01J 35/19* (2024.01); *B01J 37/038* (2013.01); *B01D 2257/40* (2013.01); *B01D 2257/502* (2013.01); *B01D 2257/702* (2013.01); *B01D 2258/01* (2013.01)

(58) Field of Classification Search
USPC ........ 502/258–262, 302–304, 324, 332–334, 502/339, 349–351, 355, 415, 439
See application file for complete search history.

(56) References Cited

U.S. PATENT DOCUMENTS

| | | | | |
|---|---|---|---|---|
| 10,335,776 | B2* | 7/2019 | Sung | B01J 37/0244 |
| 10,864,502 | B2* | 12/2020 | Sung | B01J 37/0246 |
| 11,103,855 | B2* | 8/2021 | Chiffey | B01J 37/0201 |
| 11,248,505 | B2* | 2/2022 | Sung | B01J 23/02 |
| 11,813,598 | B2* | 11/2023 | Sung | F01N 3/103 |
| 11,896,962 | B2* | 2/2024 | Sung | B01D 53/945 |
| 11,982,218 | B2* | 5/2024 | Sung | B01J 23/02 |
| 2008/0139382 | A1* | 6/2008 | Morisaka | B01J 35/19 502/343 |
| 2014/0271428 | A1* | 9/2014 | Gerlach | B01J 23/44 502/66 |
| 2014/0334989 | A1 | 11/2014 | Nazarpoor et al. | |
| 2015/0165422 | A1 | 6/2015 | Sung et al. | |
| 2015/0165423 | A1 | 6/2015 | Sung et al. | |
| 2015/0202611 | A1 | 7/2015 | Francis et al. | |
| 2016/0136617 | A1 | 5/2016 | Nazarpoor et al. | |
| 2016/0361709 | A1 | 12/2016 | Southward et al. | |
| 2018/0214824 | A1 | 8/2018 | Dumbuya et al. | |
| 2020/0078768 | A1* | 3/2020 | Patchett | B01J 23/04 |
| 2020/0346191 | A1 | 11/2020 | Yamaguchi et al. | |
| 2021/0069684 | A1* | 3/2021 | Sung | B01J 37/0246 |
| 2024/0024818 | A1* | 1/2024 | Sung | B01D 53/944 |

FOREIGN PATENT DOCUMENTS

| | | | |
|---|---|---|---|
| EP | 2363195 | A1 | 9/2011 |
| GB | 201805623 | | 5/2018 |
| JP | 2008-093496 | A | 4/2008 |
| JP | 2009-279579 | A | 12/2009 |
| JP | 2011-189306 | A | 9/2011 |
| JP | 2014-505711 | A | 3/2014 |
| JP | 2017-501031 | A | 1/2017 |
| WO | 2012/093600 | A1 | 7/2012 |
| WO | 2012/110107 | A1 | 8/2012 |
| WO | 2015/095056 | A1 | 6/2015 |
| WO | 2015/110817 | A1 | 7/2015 |
| WO | WO 2018-211406 | A1 | 11/2018 |
| WO | 2018/224651 | A1 | 12/2018 |
| WO | 2019/069232 | A1 | 4/2019 |
| WO | 2019/097878 | A1 | 5/2019 |

OTHER PUBLICATIONS

Rui, Xiao et al., "Study on VOCs Reaction Catalyzed by Monolithic Honeycomb Ceramic Loaded Cu—MC Spinel", *Shandong Chemical Industry*, vol. 48, No. 15, Aug. 8, 2019, English Abstract only.

Zhang, Hai-Long et al., "Activity and thermal stability of Pt/$Ce_{0.64}Mn_{0.16}R_{0.2}O_x$(R = Al, Zr, La, or Y) for soot and NO oxidation", *Fuel Processing Technology*, 137 (2015) pp. 38-47.

First Office Action dated Dec. 1, 2023, of counterpart Chinese Patent Application No. 202180011175.0, along with an English machine translation.

Extended European Search Report from corresponding European Patent Appln. No. 21747095 dated Jan. 16, 2024.

* cited by examiner

YTTRIUM-DOPED CATALYST SUPPORT

This application is a national stage filing under 35 U.S.C. § 371 of International Application No. PCT/US2021/015046, filed on Jan. 26, 2021, which claims priority to U.S. Provisional Application No. 62/966,167, filed on Jan. 27, 2020, the contents of which are incorporated by reference in their entirety.

The present disclosure relates generally to the field of exhaust gas treatment catalysts, particularly diesel oxidation catalyst compositions comprising a platinum group metal, a manganese component, and a support material doped with a metal component, catalyst articles and systems employing such catalyst compositions, and methods for the use of such catalyst compositions, articles, and systems.

Environmental regulations for emissions of internal combustion engines are becoming increasingly stringent throughout the world. Operation of lean burn engines, e.g., diesel engines, provide the user with excellent fuel economy due to their operation at high air/fuel ratios under fuel lean conditions. However, diesel engines also emit exhaust gas emissions containing particulate matter (PM), unburned hydrocarbons (HC), carbon monoxide (CO), and nitrogen oxides ($NO_x$), wherein $NO_x$ describes various chemical species of nitrogen oxides, including nitric oxide (NO) and nitrogen dioxide ($NO_2$), among others. The two major components of exhaust particulate matter are the soluble organic fraction (SOF) and the soot fraction. The SOF condenses on the soot in layers and is generally derived from unburned diesel fuel and lubricating oils. The SOF can exist in diesel exhaust either as a vapor or as an aerosol (i.e., fine droplets of liquid condensate), depending on the temperature of the exhaust gas. Soot is predominately composed of particles of carbon.

Oxidation catalysts comprising precious metals, such as platinum group metals (PGM) dispersed on a refractory metal oxide support, have been used to treat the exhaust of diesel engines by catalyzing the oxidation of hydrocarbon (HC) and carbon monoxide (CO) gaseous pollutants to carbon dioxide and water. Such catalysts may be contained in diesel oxidation catalysts (DOC), which are placed in the exhaust flow path from a diesel powered engine to treat the exhaust gas stream. Typically, the diesel oxidation catalysts are prepared on ceramic or metallic carrier substrates upon which one or more catalyst coating compositions are deposited.

Diesel soot removal is achieved via either active or passive regeneration of a soot filter. Active regeneration is carried out by injecting additional diesel fuel at the DOC inlet, and the exotherm released by the fuel combustion significantly raises the temperature at a downstream catalyzed soot filter (CSF), initiating soot combustion by $O_2$ according to the equation ($C+O_2 \rightarrow CO/CO_2$). This reaction typically requires temperatures in excess of 600° C. Passive soot regeneration utilizes $NO_2$ rather than $O_2$ to oxidize soot according to the equation ($C+NO_2 \rightarrow CO/CO_2+NO$). This reaction becomes quite efficient at temperature greater than 300° C. and can often be accomplished during normal driving without requiring fuel injection, which results in a fuel economy penalty.

In addition to promoting the conversion of gaseous HC, CO, and the soluble organic fraction of particulate matter, oxidation catalysts that contain platinum promote the oxidation of NO to $NO_2$. Platinum (Pt) remains the most effective PGM for oxidizing NO to $NO_2$. However, significant (often up to 50%) loss of NO oxidation activity is observed upon aging of conventional Pt-based DOCs, due at least in part to agglomeration of Pt particles. Accordingly, it would be advantageous to provide a catalyst composition comprising Pt that is not as susceptible to surface area loss, thus allowing for continued high catalytic efficiency under high temperature use conditions. Further, there is a continuing need to provide catalytic compositions that utilize metals (e.g., PGMs) efficiently and that remain effective to meet regulations for HC, $NO_x$, and CO conversion for long periods of time, particularly under high temperature conditions.

As regulations regarding vehicle emissions become more stringent, control of emissions during the cold start period has become increasingly important. Catalysts used to treat the exhaust of internal combustion engines are less effective during periods of relatively low temperature operation because the engine exhaust is not at a sufficiently high temperature for efficient catalytic conversion of noxious components in the exhaust. For example, catalytic components such as SCR catalyst components are very effective in converting $NO_x$ to $N_2$ at temperatures above 200° C. but do not exhibit sufficient activities at lower temperatures (<200° C.), such as those found during cold-start or prolonged low-speed city driving. At these low temperatures (i.e., below 200° C.), exhaust gas treatment systems generally do not exhibit sufficient catalytic activity to effectively treat hydrocarbons (HC), nitrogen oxides ($NO_x$), and/or carbon monoxide (CO) emissions.

There presently exists a disconnect between DOC and SCR performance during cold start (i.e., $NO_x$ conversion performance before the SCR becomes functional). One way to improve DOC+SCR system performance is to promote SCR performance at low temperatures by enhancing $NO_2/NO_x$ performance of the DOC at a temperature below 250° C. and further stabilizing the performance of the DOC (i.e., consistent $NO_2/NO_x$ performance between fresh and aged catalysts). Performance enhancement may be observed when there is an adequate ratio of $NO_2/NO_x$ in the feed gas to the SCR catalyst.

For control of diesel engine emissions, stable $NO_2/NO_x$ performance at 200° C. is desirable for both light-duty (LDD) and heavy-duty (HDD) applications. Illustratively, using a Mn-doped alumina to stabilize Pt can result in good $NO_2/NO_x$ performance. See, e.g., U.S. Patent Application Publication Nos. 2015/0165422 and 2015/0165423 to BASF, which are incorporated herein by reference. However, while previously disclosed Mn-doped alumina/Pt catalysts offered stabilized $NO_2/NO_x$ performance, these catalysts did not enhance low temperature $NO_2/NO_x$ performance. Accordingly, there remains a need in the art for oxidation catalyst compositions with both enhanced stability toward aging and enhanced low temperature $NO_2/NO_x$ performance.

The present disclosure generally provides catalyst compositions, catalyst articles and catalyst systems comprising such catalyst articles which exhibit enhanced aging stability with respect to oxidation performance and enhanced low temperature $NO_2/NO_x$ performance. Surprisingly, it has been found that an oxidation catalyst composition according to the present disclosure comprising a platinum group metal (PGM) and a refractory metal oxide doped with manganese and a metal component provided a catalyst having superior low temperature $NO_2/NO_x$ oxidation performance as well as enhanced aging stability with respect to $NO_2/NO_x$ ratio. Specifically, an oxidation catalyst comprising platinum, a manganese component, and an yttrium component, all supported on high surface area alumina, stabilized the platinum against sintering and retained NO$_2$ formation after hydrothermal aging.

Accordingly, in one aspect, this disclosure provides an oxidation catalyst composition comprising: a first platinum group metal (PGM) component; a manganese (Mn) component; a first refractory metal oxide support material; and a metal component comprising yttrium, lanthanum, tin, magnesium, cerium, titanium, an oxide of any of the foregoing, or a combination of any of the foregoing; wherein the first PGM component, the manganese component, and the metal component are supported on the first refractory metal oxide support material.

In some embodiments, the metal component is yttrium or an oxide thereof.

In some embodiments, the Mn component is present in the range of from about 0.1% to about 10% by weight, based on the total weight of the composition and calculated as the oxide. In some embodiments, the Mn component is present in an amount from about 3% to about 10% by weight, based on the total weight of the composition and calculated as the oxide. In some embodiments, the Mn component is selected from the group consisting of MnO, Mn$_2$O$_3$, MnO$_2$, and combinations of any of the foregoing.

In some embodiments, the first PGM component is present in an amount from about 0.1% to about 20% by weight, based on the weight of the composition. In some embodiments, the first PGM component is present in an amount from about 1% to about 4% by weight, based on the weight of the composition.

In some embodiments, the first PGM component is platinum or a combination of platinum and palladium. In some embodiments, the first PGM component is platinum. In some embodiments, the first PGM component is a combination of platinum and palladium, and wherein the ratio of platinum to palladium by weight is from about 20 to about 0.1.

In some embodiments, the yttrium is present in an amount from about 0.5% to about 10% by weight, based on the total weight of the composition and calculated as the oxide. In some embodiments, a molar ratio of yttrium to manganese is from about 0.1 to about 10. In some embodiments, a molar ratio of yttrium to manganese is from about 0.5 to about 3.

In some embodiments, the first refractory metal oxide support comprises alumina, silica, zirconia, titania, ceria, or a combination of any of the foregoing. In some embodiments, the first refractory metal oxide support is selected from the group consisting of gamma alumina, silica doped alumina, ceria doped alumina, zirconia doped alumina, and titania doped alumina. In some embodiments, the first refractory metal oxide support is selected from the group consisting of gamma alumina and alumina doped with from about 1% to about 20% (e.g., about 1% to about 10%) by weight of SiO$_2$.

In some embodiments, the oxidation catalyst composition further comprises a first zeolite. In some embodiments, the first zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths of any of the foregoing. In some embodiments, the first zeolite is ZSM-5, beta, mordenite, Y zeolite, chabazite, ferrierite, or a combination of any of the foregoing.

In another aspect, this disclosure provides a catalytic article comprising a catalyst substrate having an inlet end and an outlet end defining an overall length, and a catalytic coating comprising one or more washcoats disposed on at least a portion thereof, wherein at least one of said washcoats comprises an oxidation catalyst composition as disclosed herein. In some embodiments, the catalytic coating comprises: a first washcoat comprising an oxidation catalyst composition as disclosed herein, disposed on at least a portion of the overall length of the catalyst substrate; and a second washcoat disposed on at least a portion of the overall length of the catalyst substrate, the second washcoat comprising: a second PGM component supported on a second refractory metal oxide support material; and a second zeolite. In some embodiments, the second zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MET, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths of any of the foregoing. In some embodiments, the second zeolite is ZSM-5, beta, mordenite, Y zeolite, chabazite, ferrierite, or a combination of any of the foregoing. In some embodiments, the second zeolite is beta zeolite, wherein the beta zeolite is promoted with iron in an amount from about 0.5% to about 10% by weight, calculated as the oxide.

In some embodiments, the second PGM component is platinum or a combination of platinum and palladium. In some embodiments, the second PGM component is platinum. In some embodiments, the second PGM component is a combination of platinum and palladium, wherein the ratio of platinum to palladium by weight is from about 0.1 to about 20.

In some embodiments, the second refractory metal oxide support is selected from the group consisting of gamma alumina and alumina doped with from about 1% to about 20% (such as, e.g., about 1% to about 10%) by weight of SiO$_2$.

In some embodiments, the second washcoat is substantially free of a manganese component. In some embodiments, the second washcoat contains less than 2 wt %, less than 1.5 wt %, less than 1.0 wt %, less than 0.5 wt %, less than 0.25 wt %/o, less than 0.01 wt %, less than 0.001 wt %, or even 0 wt % of a manganese component, based on the weight of the indicated total composition. In some embodiments, the second washcoat is substantially free of any manganese component. In some embodiments, the second washcoat contains less than 2 wt %, less than 1.5 wt %, less than 1.0 wt %, less than 0.5 wt %, less than 0.25 wt %, less than 0.01 wt %, less than 0.001 wt %, or even 0 wt % of any manganese component, based on the weight of the indicated total composition. In some embodiments, the second washcoat is substantially free of any yttrium component. In some embodiments, the second washcoat contains less than 2 wt %, less than 1.5 wt/o, less than 1.0 wt %, less than 0.5 wt %, less than 0.25 wt %, less than 0.01 wt %, less than 0.001 wt %, or even 0 wt % of any yttrium component, based on the weight of the indicated total composition.

In some embodiments, the second washcoat is disposed directly on the catalyst substrate, and the first washcoat is on at least a portion of the second washcoat.

In some embodiments, the first washcoat is disposed directly on the catalyst substrate, and the second washcoat is on at least a portion of the first washcoat.

In some embodiments, the catalytic article has a zoned configuration, wherein: the first washcoat is disposed on the catalyst substrate from the outlet end to a length from about 10% to about 80% of the overall length; and the second washcoat is disposed on the catalyst substrate from the inlet end to a length from about 30% to about 90% of the overall length.

In some embodiments, the catalytic article further comprising a third washcoat comprises a third refractory metal oxide impregnated with a third PGM component comprising platinum or a combination of platinum and palladium. In some embodiments, the third PGM component is platinum. In some embodiments, the third PGM component is a combination of platinum and palladium. In some embodiments, the third PGM component comprises platinum and palladium. In some embodiments, the third refractory metal oxide is gamma alumina or alumina doped with from about 1% to about 20% by weight of $SiO_2$ (such as, e.g., about 1% to about 10% by weight of $SiO_2$).

In some embodiments, the third washcoat is disposed directly on the catalyst substrate, and the first and second washcoats are disposed on at least a portion of the third washcoat.

In some embodiments, the catalytic article has a zoned configuration, wherein: the third washcoat is disposed directly on the substrate, the first washcoat is disposed on the third washcoat from the outlet end to a length from about 10% to about 80% of the overall length; and the second washcoat is disposed on the third washcoat from the inlet end to a length from about 30% to about 90% of the overall length.

In a further aspect, this disclosure provides an exhaust gas treatment system comprising a catalytic article as disclosed herein, wherein the catalytic article is positioned downstream of and in fluid communication with an internal combustion engine.

In yet another aspect, this disclosure provides a method for treating an exhaust gas stream comprising at least one exhaust gas component selected from hydrocarbons, carbon monoxide, and $NO_x$, the method comprising passing the exhaust gas stream through a catalytic article, or an exhaust gas treatment system, each as disclosed herein.

These and other features, aspects, and advantages of the disclosure will be apparent from a reading of the following detailed description together with the accompanying drawings, which are briefly described below. The disclosure includes any combination of two, three, four, or more of the above-noted embodiments as well as combinations of any two, three, four, or more features or elements set forth in this disclosure, regardless of whether such features or elements are expressly combined in a specific embodiment description herein. This disclosure is intended to be read holistically such that any separable features or elements of the disclosure, in any of its various aspects and embodiments, should be viewed as intended to be combinable unless the context clearly dictates otherwise. Other aspects and advantages of the present disclosure will become apparent from the following.

EMBODIMENTS

Non-limiting embodiments of this disclosure include.
1. An oxidation catalyst composition comprising:
a first platinum group metal (PGM) component;
a manganese (Mn) component;
a first refractory metal oxide support material; and
a metal component comprising yttrium, lanthanum, tin, magnesium, cerium, titanium, or a combination thereof:
wherein the first PGM component, the manganese component, and the metal component are supported on the first refractory metal oxide support material.
2. The oxidation catalyst composition of Embodiment 1, wherein the metal component is yttrium or an oxide thereof.
3. The oxidation catalyst composition of Embodiment 1 or 2, wherein the Mn component is present in the range of from about 0.1% to about 10% by weight, based on the total weight of the composition and calculated as the oxide.
4. The oxidation catalyst composition of any of Embodiments 1 to 3, wherein the Mn component is present in an amount from about 3% to about 10% by weight, based on the total weight of the composition and calculated as the oxide.
5. The oxidation catalyst composition of any of Embodiments 1 to 4, wherein the Mn component is selected from the group consisting of $MnO$, $Mn_2O_3$, $MnO_2$, and combinations thereof.
6. The oxidation catalyst composition of any of Embodiments 1 to 5, wherein the first PGM component is present in an amount from about 0.1% to about 20% by weight, based on the weight of the composition.
7. The oxidation catalyst composition of any of Embodiments 1 to 6, wherein the first PGM component is present in an amount from about 1% to about 4% by weight, based on the weight of the composition.
8. The oxidation catalyst composition of any of Embodiments 1 to 7, wherein the first PGM component is platinum or a combination of platinum and palladium.
9. The oxidation catalyst composition of any of Embodiments 1 to 8, wherein the first PGM component is a combination of platinum and palladium, and wherein the ratio of platinum to palladium by weight is from about 20 to about 0.1.
10. The oxidation catalyst composition of any of Embodiments 2 to 9, wherein the yttrium is present in an amount by weight of from about 0.5% to about 10%, based on the total weight of the composition, and calculated as the oxide.
11. The oxidation catalyst composition of Embodiment 8, wherein a molar ratio of yttrium to manganese is from about 0.1 to about 10.
12. The oxidation catalyst composition of Embodiment 8, wherein a molar ratio of yttrium to manganese is from about 0.5 to about 3.
13. The oxidation catalyst composition of any of Embodiments 1 to 12, wherein the first refractory metal oxide support comprises alumina, silica, zirconia, titania, ceria, or a combination thereof.
14. The oxidation catalyst composition of any of Embodiments 1 to 13, wherein the first refractory metal oxide support is selected from the group consisting of gamma alumina, silica doped alumina, ceria doped alumina, and titania doped alumina.
15. The oxidation catalyst composition of any of Embodiments 1 to 14, wherein the first refractory metal oxide support is selected from the group consisting of gamma alumina and alumina doped with from about 1% to about 10% by weight of $SiO_2$.
16. The oxidation catalyst composition of any of Embodiments 1 to 15, further comprising a first zeolite.
17. The oxidation catalyst composition of Embodiment 16, wherein the first zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

18. The oxidation catalyst composition of Embodiment 16 or 17, wherein the first zeolite is ZSM-5, beta, mordenite, Y zeolite, chabazite, ferrierite, or a combination thereof.

19. A catalytic article comprising a substrate having an inlet end and an outlet end defining an overall length, and a catalytic coating comprising one or more washcoats disposed on at least a portion thereof, wherein at least one of said washcoats comprises the oxidation catalyst composition of any of Embodiments 1-18.

20. The catalytic article of Embodiment 19, wherein the catalytic coating comprises:
   a first washcoat comprising the oxidation catalyst composition of any of Embodiments 1 to 18 disposed on at least a portion of the overall length of the catalyst substrate; and
   a second washcoat disposed on at least a portion of the overall length of the substrate, the second washcoat comprising:
   a second PGM component supported on a second refractory metal oxide support material; and
   a second zeolite.

21. The catalytic article of Embodiment 20, wherein the second zeolite has a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

22. The catalytic article of Embodiment 20 or 21, wherein the second zeolite is ZSM-5, beta, mordenite, Y zeolite, chabazite, ferrierite, or a combination thereof.

23. The catalytic article of any one of Embodiments 20 to 22, wherein the second zeolite is beta zeolite, and wherein the beta zeolite is promoted with iron in an amount of from about 0.5% to about 10% by weight, calculated as the oxide.

24. The catalytic article of any one of Embodiments 20 to 23, wherein the second PGM component is a combination of platinum and palladium, wherein the ratio of platinum to palladium by weight is from about 0.1 to about 20.

25. The catalytic article of any one of Embodiments 20 to 24, wherein the second refractory metal oxide support is selected from the group consisting of gamma alumina and alumina doped with from about 1% to about 10% by weight of $SiO_2$.

26. The catalytic article of any one of Embodiments 20 to 25, wherein the second washcoat is substantially free of a manganese component.

27. The catalytic article of any one of Embodiments 23 to 26, wherein the second washcoat is substantially free of any yttrium component.

28. The catalytic article of any one of Embodiments 20 to 27, wherein the second washcoat is disposed directly on the substrate, and the first washcoat is on at least a portion of the second washcoat.

29. The catalytic article of any one of Embodiments 20 to 27, wherein the first washcoat is disposed directly on the substrate, and the second washcoat is on at least a portion of the first washcoat.

30. The catalytic article of any one of Embodiments 20 to 27, having a zoned configuration, wherein the first washcoat is disposed on the catalyst substrate from the outlet end to a length from about 10% to about 80% of the overall length; and the second washcoat is disposed on the catalyst substrate from the inlet end to a length from about 30% to about 90% of the overall length.

31. The catalytic article of any one of Embodiments 20 to 30, further comprising a third washcoat comprising a third refractory metal oxide impregnated with a third PGM component comprising platinum and palladium.

32. The catalytic article of Embodiment 31, wherein the third refractory metal oxide is gamma alumina or alumina doped with from about 1% to about 10% $SiO_2$.

33. The catalytic article of Embodiment 31 or 32, wherein the third washcoat is disposed directly on the substrate, and the first and second washcoats are disposed on at least a portion of the third washcoat.

34. The catalytic article of Embodiment 31 or 32, having a zoned configuration, wherein the third washcoat is disposed directly on the substrate, the first washcoat is disposed on the third washcoat from the outlet end to a length from about 10% to about 80% of the overall length; and the second washcoat is disposed on the third washcoat from the inlet end to a length from about 30% to about 90% of the overall length.

35. An exhaust gas treatment system comprising the catalytic article of any one of Embodiments 20 to 34, wherein the catalytic article is downstream of and in fluid communication with an internal combustion engine.

36. A method for treating an exhaust gas stream comprising hydrocarbons and/or carbon monoxide and/or $NO_x$, the method comprising passing the exhaust gas stream through the catalytic article of any one of Embodiments 20 to 34, or the exhaust gas treatment system of Embodiment 35.

BRIEF DESCRIPTION OF THE DRAWINGS

In order to provide an understanding of various embodiments of the disclosure, reference is made to the appended drawings, in which reference numerals refer to components of non-limiting exemplary embodiments. The drawings are exemplary only and should not be construed as limiting the disclosure in any way. Some non-limiting embodiments described herein are illustrated in the accompanying figures. For simplicity and clarity of illustration, features illustrated in the figures are not necessarily drawn to scale. For example, the dimensions of some features may be exaggerated relative to other features for clarity. Further, where considered appropriate, reference labels have been repeated among the figures to indicate corresponding or analogous elements.

Figure 1:
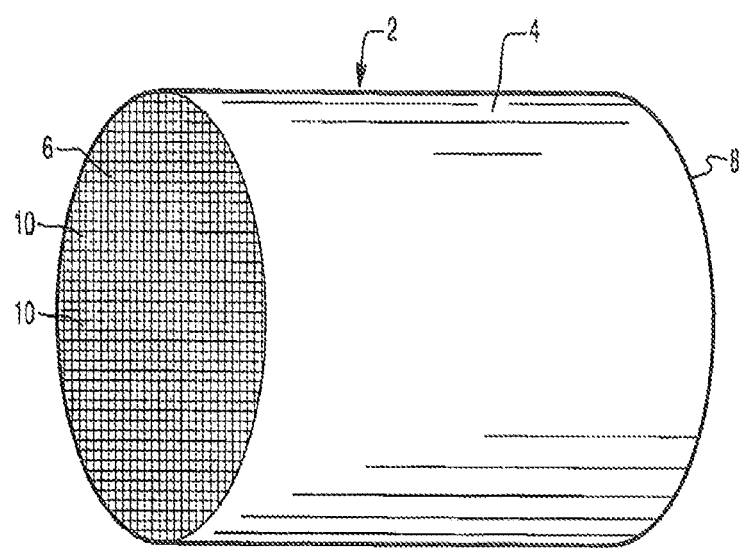
FIG. 1 is a perspective view of an example honeycomb-type substrate which may comprise a catalyst (i.e., a selective catalytic reduction catalyst) washcoat composition in accordance with the present disclosure.

The present disclosure generally provides catalysts, catalyst articles, and catalyst systems comprising such catalyst articles that may be suitable for oxidation of one or more exhaust gas components (e.g., CO, HCs, and $NO_x$). For example, the disclosure provides catalyst compositions comprising a platinum group metal (PGM) component and a refractory metal oxide support material doped with a manganese component and a metal component.

Non-limiting embodiments of the present disclosure will be described more fully hereinafter. However, this disclosure may be embodied in many different forms and should not be construed as limited to the embodiments set forth herein, rather, these embodiments are provided so that this disclosure will be thorough and complete, and will fully convey the scope of the subject matter to those skilled in the art.

Definitions

As used herein, the articles "a" and "an" refer to one or to more than one (e.g., at least one) of the grammatical object. Any ranges recited herein are inclusive (i.e., the ranges include the endpoints).

As used herein, the term "about" describes and accounts for small fluctuations. For instance, "about" may mean the numeric value may be modified by ±5%, ±4%, ±3%, ±2%, ±1%, ±0.5%, ±0.4%, ±0.3%, ±0.2%, ±0.1% or 0.05%. All numeric values are modified by the term "about," whether or not explicitly indicated. Numeric values modified by the term "about" include the specific identified value. For example, "about 5.0" includes 5.0.

As used herein, the term "abatement" means a decrease in an amount, caused by any means.

As used herein, the term "associated" means, i.e., "equipped with", "connected to" or in "communication with", e.g., "electrically connected" or in "fluid communication with" or otherwise connected in away to perform a function. The term "associated" may mean directly associated with or indirectly associated with, i.e., through one or more other articles or elements.

As used herein, the term "catalyst" refers to a material that promotes a chemical reaction. The catalyst includes the "catalytically active species" and the "support" that carries or supports the catalytically active species. For example, refractory metal oxide particles may be a support for platinum group metal catalytic species and are included within the term "catalyst".

As used herein, the term "catalytic article" refers to an article comprising a substrate having a catalyst coating composition.

As used herein, "CSF" refers to a catalyzed soot filter, which is a wall-flow monolith. A wall-flow filter consists of alternating inlet channels and outlet channels, where the inlet channels are plugged on the outlet end and the outlet channels are plugged on the inlet end. A soot-carrying exhaust gas stream entering the inlet channels is forced to pass through the filter walls before exiting from the outlet channels. In addition to soot filtration and regeneration, a CSF may carry oxidation catalysts to oxidize CO and HC to $CO_2$ and $H_2O$, or to oxidize NO to $NO_2$ to accelerate downstream SCR catalysis or to facilitate the oxidation of soot particles at lower temperatures. An SCR catalyst composition can also be coated directly onto a wall-flow filter, which is called SCRoF.

As used herein, the phrase "catalyst system" refers to a combination of two or more catalysts. e.g., a combination of a first low-temperature $NO_x$ adsorber (LT-NA) catalyst and a second catalyst which may be a diesel oxidation catalyst (DOC), a LNT, or a SCR catalyst article. In some embodiments, the catalyst system may be in the form of a washcoat in which the two catalysts are mixed together or coated in separate layers As used herein, the term "configured" is intended to be an open-ended term, as are the terms "comprising" or "containing". The term "configured" is not meant to exclude other possible articles or elements. The term "configured" may be equivalent to "adapted".

As used herein, "DOC" refers to a diesel oxidation catalyst, which converts hydrocarbons and carbon monoxide in the exhaust gas of a diesel engine, as well as oxides nitric oxide (NO) to nitrogen dioxide ($NO_2$). Typically, a DOC comprises: one or more platinum group metals, such as palladium and/or platinum; a support material, such as alumina; a zeolite for HC storage; and optionally, promoters and/or stabilizers.

In general, as used herein, the term "effective" means, e.g., from about 35% to about 100% effective, i.e., from about 40%, about 45%, about 50%, or about 55% to about 60%, about 65%, about 70%, about 75%, about 80%, about 85%, about 90%, or about 95%, with regards to the defined catalytic activity or storage/release activity, by weight or by moles.

As used herein, the term "exhaust stream" or "exhaust gas stream" refers to any combination of flowing gas that may contain solid or liquid particulate matter. The stream comprises gaseous components and is, e.g., exhaust of a lean burn engine, which may contain certain non-gaseous components, such as liquid droplets, solid particulates, and the like. The exhaust gas stream of a combustion engine typically further comprises combustion products ($CO_2$ and $H_2O$), products of incomplete combustion (carbon monoxide (CO) and hydrocarbons (HC)), oxides of nitrogen ($NO_x$), combustible and/or carbonaceous particulate matter (soot), and un-reacted oxygen and nitrogen.

As used herein, the terms "upstream" and "downstream" refer to relative directions according to the flow of an engine exhaust gas stream from an engine towards a tailpipe, with the engine in an upstream location and the tailpipe and any pollution abatement articles, such as filters and catalysts, being downstream from the engine. The inlet end of a substrate is synonymous with the "upstream" end or "front" end. The outlet end is synonymous with the "downstream" end or "rear" end. An upstream zone is upstream of a downstream zone. An upstream zone may be closer to the engine or manifold, and a downstream zone may be further away from the engine or manifold.

As used herein, the term "in fluid communication" is used to refer to articles positioned on the same exhaust line. Illustratively, a common exhaust stream passes through articles that are in fluid communication with each other. Articles in fluid communication may be adjacent to each other in the exhaust line. Alternatively, articles in fluid communication may be separated by one or more articles, also referred to as "washcoated monoliths."

As used herein, the term "functional article" refers to an article comprising a substrate having a functional coating composition disposed thereon, in particular a catalyst and/or sorbent coating composition.

As used herein, "impregnated" or "impregnation" refers to permeation of a catalytic material into the porous structure of a support material.

As used herein, "LNT" refers to a lean $NO_x$ trap, which is a catalyst containing a platinum group metal, ceria, and an alkaline earth trap material suitable to adsorb $NO_x$ during lean conditions (e.g., BaO or MgO). Under rich conditions, $NO_x$ is released and reduced to nitrogen.

As used herein, the term "molecular sieves," such as zeolites and other zeolitic framework materials (e.g., isomorphously substituted materials), refers to materials based on an extensive three-dimensional network of oxygen ions containing generally tetrahedral type sites and having a substantially uniform pore distribution, with the average pore size being no larger than 20 Angstroms (Å). Molecular sieves can be differentiated mainly according to the geometry of the voids which are formed by the rigid network of the $(SiO_4)/AlO_4$ tetrahedra. The entrances to the voids are formed from 6, 8, 10, or 12 ring atoms with respect to the atoms which form the entrance opening. Molecular sieves are crystalline materials having rather uniform pore sizes which, depending upon the type of molecular sieves and the type and amount of cations included in the molecular sieves lattice, range from about 3 to about 10 Å in diameter. Chabazite (CHA) is an example of an "8-ring" molecular sieve having 8-ring pore openings and double-six ring secondary building units and having a cage like structure resulting from the connection of double six-ring building units by 4 ring connections. Molecular sieves comprise small pore, medium pore, and large pore molecular sieves, as well as combinations of any of the foregoing. The pore sizes are defined by the largest ring size.

As used herein, the terms "nitrogen oxides" or "$NO_x$," designate the oxides of nitrogen, such as NO, $NO_2$, or $N_2O$.

As used herein, the terms "on" and "over", in reference to a coating layer, may be used synonymously. The term "directly on" means in direct contact with. In some embodiments, disclosed articles are referred to as comprising one coating layer "on" a second coating layer, and such language is intended to encompass embodiments with intervening layers, where direct contact between the coating layers is not required (i.e., "on" is not equated with "directly on").

As used herein, the term "promoted" refers to a component that is intentionally added to, e.g., a support material, as opposed to impurities inherent in the support material.

As used herein, the term "selective catalytic reduction" (SCR) refers to a catalytic process of reducing oxides of nitrogen to dinitrogen ($N_2$) using a nitrogenous reductant.

As used herein, the term "substantially free" of [X] means "little or no" [X] or "no intentionally added" [X] and having only trace and/or inadvertent amounts of [X]. For instance, in certain embodiments, "substantially free" means less than 2 wt % (weight %), less than 1.5 wt %, less than 1.0 wt %, less than 0.5 wt %, less than 0.25 wt %, less than 0.01 wt %, less than 0.001 wt %, or even 0 wt %, based on the weight of the indicated total composition.

As used herein, the term "substrate" refers to a monolithic material onto which a catalyst composition, that is, a catalytic coating, is disposed, typically in the form of a washcoat. In some embodiments, the substrates are flow-through monoliths and monolithic wall-flow filters. Flow-through and wall-flow substrates are also taught, e.g., in PCT International Application Publication No. WO2016/070090, which is incorporated herein by reference. A washcoat is formed by preparing a slurry containing a specified solids content (e.g., about 30% to about 90% by weight) of a catalyst in a liquid, which is then coated onto a substrate and dried to provide a washcoat layer. Reference to a "monolithic substrate" means a unitary structure that is homogeneous and continuous from inlet to outlet. A washcoat is formed by preparing a slurry containing a certain solid content (e.g., about 20% to about 90% by weight) of particles in a liquid vehicle, which is then coated onto a substrate and dried to provide a washcoat layer.

As used herein, the term "support" refers to any high surface area material, usually a refractory metal oxide material, upon which a catalytic metal is applied.

As used herein, the term "washcoat" has its usual meaning in the art of a thin, adherent coating of a catalytic or other material applied to a substrate material, such as a honeycomb-type substrate, which is sufficiently porous to permit the passage of the gas stream being treated. The washcoat containing the PGM particles can optionally comprise a binder selected from silica, alumina, titania, zirconia, ceria, and combinations of any of the foregoing. The loading of the binder is generally from about 0.1 wt % to about 10 wt %, based on the weight of the washcoat. As used herein and as described in Heck, Ronald and Farrauto, Robert, Catalytic Air Pollution Control, New York: Wiley-Interscience, 2002, pp. 18-19, a washcoat layer includes a compositionally distinct layer of material disposed on the surface of a monolithic substrate or an underlying washcoat layer. A substrate can contain one or more washcoat layers, and each washcoat layer can be different in some way (e.g., may differ in physical properties thereof such as, e.g., particle size) and/or may differ in its chemical catalytic functions.

As used herein, "weight percent (wt %)," if not otherwise indicated, is based on an entire composition free of any volatiles, that is, based on dry solids content. Unless otherwise indicated, all parts and percentages are by weight.

As used herein, the term "zeolite" refers to a specific example of a molecular sieve, further including silicon and aluminum atoms. Generally, a zeolite is defined as an aluminosilicate with an open 3-dimensional framework structure composed of corner-sharing $TO_4$ tetrahedra, where T is Al or Si, or optionally P. Cations that balance the charge of the anionic framework are loosely associated with the framework oxygen atoms, and the remaining pore volume is filled with water molecules. The non-framework cations are generally exchangeable, and the water molecules removable.

Aluminosilicate zeolite structures do not include phosphorus or other metals isomorphically substituted in the framework. That is, "aluminosilicate zeolite" excludes aluminophosphate materials such as SAPO, AlPO, and MeAlPO materials, while the broader term "zeolite" includes aluminosilicates and aluminophosphates. For the purposes of this disclosure, SAPO, AlPO, and MeAlPO materials are considered non-zeolitic molecular sieves.

A present zeolite, independently, may comprise $SiO_4/AlO_4$ tetrahedra that are linked by common oxygen atoms to form a three-dimensional network. The molar ratio of silica-to-alumina ("SAR") of a present zeolite can vary over a wide range, but is generally 2 or greater. For instance, a present zeolite may have a SAR of from about 5 to about 1000.

Zeolites are comprised of secondary building units (SBU) and composite building units (CBU), and appear in many different framework structures. Secondary building units contain up to 16 tetrahedral atoms and are non-chiral. Composite building units are not required to be achiral, and cannot necessarily be used to build the entire framework. For example, a group of zeolites may have a single 4-ring (s4r) composite building unit in their framework structure. In the 4-ring, the "4" denotes the positions of tetrahedral silicon and aluminum atoms, and the oxygen atoms are located in between tetrahedral atoms. Other composite building units include, e.g., a single 6-ring (s6r) unit, a double 4-ring (d4r) unit, and a double 6-ring (d6r) unit. The d4r unit is created by joining two s4r units. The d6r unit is created by joining two s6r units. In a d6r unit, there are twelve tetrahedral atoms.

Typically, any framework type of zeolite can be used, such as framework types of ABW, ACO, AEI, AEL, AEN, AET, AFI, AFN, AFO, AFR, AFS, AFT, AFX, AFY, AHT, APC, APD, ASV, ATN, ATO, ATS, ATU, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO, DFT, DON, EAB, EDI, EEI, EMT, EON, EPI, ERI, ESV, ETR, EUO, EZT, FAU, FER. GIS, GME, GON, GOO, HEU, IFR, IFY, IHW, IMF, IRN, ISV. ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR, PAU, PCR, PHI, PON, PUN, RHO, RON, RRO, RSN, RTE, RTH, RWR, RWY, SAF, SAO, SAS, SAT, SAV. SBE, SBS, SBT, SCO, SEW, SFE, SFF, SFG, SFH, SFN, SFO, SFS. SFW. SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths of any of the foregoing.

Zeolites are crystalline materials having rather uniform pore sizes which, depending upon the type of zeolite and the type and amount of cations included in the zeolite lattice, range from about 3 to 10 Ångstroms in diameter. The pore sizes are defined by the ring size. As used herein, the term "small pore" refers to pore openings which are smaller than about 5 Ångstroms. e.g., on the order of about 3.8 Ångstroms.

A small pore zeolite contains channels defined by up to eight tetrahedral atoms. The phrase "8-ring" zeolite refers to a zeolite having 8-ring pore openings and double-six ring secondary building units and having a cage-like structure resulting from the connection of double six-ring building units by 4 rings. Exemplary small pore zeolites include framework types ACO, AEI, AEN, AFN, AFT, AFX, ANA. APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths of any of the foregoing.

A medium pore zeolite contains channels defined by ten-membered rings. Exemplary medium pore zeolites include framework types AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths of any of the foregoing.

A large pore zeolite contains channels defined by twelve-membered rings. Exemplary large pore zeolites include framework types AFI, AFR, AFS, AFY, ASV. ATO. ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths of any of the foregoing.

All methods described herein can be performed in any suitable order unless otherwise indicated herein or otherwise clearly contradicted by context. The use of any and all examples, or exemplary language (e.g., "such as") provided herein, is intended merely to better illuminate the materials and methods and does not pose a limitation on the scope unless otherwise claimed. No language in the specification should be construed as indicating any non-claimed element as essential to the practice of the disclosed materials and methods. Illustratively, the term "exemplary," as used herein, means serving as an example and is not intended to limit the scope of the disclosure in any way. All U.S. patent applications, patent application publications, and patents referred to herein are hereby incorporated by reference in their entireties.

Oxidation Catalyst Composition

As described herein above, the disclosure generally provides an oxidation catalyst composition comprising a platinum group metal (PGM) component, a refractory metal oxide support material, a manganese component, and a metal component. Each of these features is further described herein below.

Platinum Group Metal (PGM) Component

As used herein, "PGM" refers to a platinum group metal Platinum group metals include platinum (Pt), palladium (Pd), ruthenium (Ru), rhodium (Rh), osmium (Os), iridium (Ir), and mixtures of any of the foregoing. PGM components useful in the disclosed DOC compositions include any component that includes a PGM, such as platinum, palladium, ruthenium, rhodium, osmium, or iridium. The PGM component can include the PGM in any valence state. As used herein, the term "PGM component" refers both to a catalytically active form of the respective PGM, as well as the corresponding PGM compound, complex, or the like which, upon calcination or use of the catalyst, decomposes or otherwise converts to the catalytically active form, usually the metal or the metal oxide. The PGM component may be in metallic form, with zero valence ("PGM(0)"), or the PGM component may be in an oxide form. The amount of PGM(0) present can be determined, e.g., using ultrafiltration, followed by Inductively Coupled Plasma/Optical Emission Spectrometry (ICP-OES), or by x-ray photoelectron spectroscopy (XPS).

The PGM component present in the oxidation catalyst composition may be described as PGM particles, e.g., particles of platinum metal, palladium metal, or both. The size of the PGM particles in catalyst compositions disclosed herein can vary. As used herein, "particle size" refers to the smallest diameter sphere that will completely enclose the particle, and this measurement relates to an individual particle as opposed to an agglomeration of two or more particles. Particle size may be measured by laser light scattering techniques, with dispersions or dry powders, e.g., according to ASTM method D4464. Particle size may also be measured by Scanning Electron Microscopy (SEM) or Transmission Electron Microscopy (TEM) for submicron size particles, or by a particle size analyzer for support-containing particles (micron size).

In addition to TEM, carbon monoxide (CO) chemisorption may be used to determine average PGM particle size. This technique does not differentiate between various PGM species (e.g., Pt, Pd, etc., as compared to XRD, TEM, and SEM) and only determines the average particle size. To determine average particle size by CO chemisorption, samples of catalyst washcoat may be ground, and a small (e.g., about 100 mg) quantity was analyzed by means of pulsed CO injection as follows: Pretreatment: drying at about 150° C. in helium, followed by heating at about 400° C. in a about 5% hydrogen in nitrogen atmosphere; CO Chemisorption: sample pulsed at room temperature with about 10% CO in helium.

In some embodiments, the PGM may be described as "colloidal", meaning the PGM particles have an average particle size of from about 4 nm to about 15 nm. As used herein, the term "average particle size" refers to a characteristic of particles that indicates, on average, the diameter of the particles. In some embodiments, "average particle size" may refer to $D_{50}$, meaning half of the population of particles has a particle size above this point, and half below. $D_{50}$ particle size distribution indicates that 90% of the particles (by number) have a Feret diameter below a certain size. Average particle size can be measured by, e.g., transmission electron microscopy (TEM) by visually examining a TEM image, measuring the diameter of the particles in the image, and calculating the average particle size of the measured particles based on magnification of the TEM image.

Reference herein to average particle size reflects the average particle size of fresh/calcined material, e.g., determined after calcination of the particles, but prior to aging of the particles. By "fresh", it is meant that the particles have not been subjected to temperatures greater than about 500° C. In some embodiments, the oxidation catalyst composition is fresh. In other embodiments, the oxidation catalyst composition may be referred to as degreened. As used herein, the term "degreened" refers to a catalyst composition that has been subjected to a temperature in the range of about 500° C. to about 550° C. for a period of time (e.g., for about 1 to about 5 hours) with engine exhaust or simulated exhaust gas. In some embodiments, the oxidation catalyst composition may be referred to as aged. As used herein, the term "aged" refers to a catalyst composition that has been subjected to temperatures of about 650° C. or greater (e.g., about 650° C., about 700° C., about 800° C., about 900° C., or about 1000° C.) for a period of time (e.g., from about 5 hours to about 100 hours). As will be recognized by one of skill in the art, subjecting a PGM particle to degreening or aging conditions may induce changes to particle sizes as described herein above.

In some embodiments, reference is made to a "first" PGM component, a "second" PGM component, and a "third" PGM component, so as to distinguish each PGM component. As used herein, the "first" PGM component is associated with the "first" refractory metal oxide. In some embodiments, catalytic articles are provided comprising additional washcoats in which an optional "second" PGM component is associated with an optional "second" refractory metal oxide, and an optional "third" palladium component is associated with an optional "third" refractory metal oxide. Each of the first, second, and third PGM components, where present, may be the same or different. In some embodiments, the first and second PGM components are the same. In some embodiments, the first, second, and third PGM components are the same. In some embodiment, the first, second, and third PGM components are each different. In some embodiments, the second and third PGM components are the same, and are different from the first PGM component.

In some embodiments, the first PGM component comprises platinum, palladium, ruthenium, rhodium, iridium, or a combination of any of the foregoing. In some embodiments, the first PGM component comprises platinum, palladium, or a combination of both. In some embodiments, the first PGM component is platinum. In some embodiments, the first PGM component is a combination of platinum and palladium. Exemplary weight ratios for such Pt/Pd combinations include weight ratios of from about 20:1 to about 1:10 Pt:Pd, e.g., about 20:1, about 19:1, about 18:1, about 17:1, about 16:1, about 15:1, about 14:1, about 13:1, about 12:1, about 11:1, about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10. In some embodiments, the Pt/Pd weight ratio is about 2:1. In some embodiments, the Pt/Pd weight ratio is about 3:1. In some embodiments, the Pt/Pd weight ratio is about 5:1. In some embodiments, the Pt/Pd weight ratio is about 10:1. In some embodiments, the Pt/Pd weight ratio is about 20:1.

The first PGM component may be present in an amount in the range of about 0.01 to about 20% on a metal basis, based on the total weight of the oxidation catalyst composition. The oxidation catalyst composition may comprise, e.g., a Pt or Pt/Pd component at about 0.1 wt %, about 0.5 wt %, about 1.0 wt %, about 1.5 wt %, about 2.0 wt %, about 3 wt %, about 5 wt %, about 7 wt %, about 9 wt %, about 10 wt %, about 12 wt %, about 15 wt %, about 16 wt %, about 17 wt %, about 18 wt %, about 19 wt %, or about 20 wt %, based on the total weight of the dry oxidation catalyst composition. In some embodiments, the first PGM component is present in an amount in the range of about 1% to about 4% on a metal basis, based on the total weight of the oxidation catalyst composition.

In some embodiments, the second PGM component is platinum. In some embodiments, the second PGM component is a combination of platinum and palladium. Exemplary weight ratios for such Pt/Pd combinations include weight ratios of from about 10:1 to about 1:10 Pt:Pd, e.g., about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10. In some embodiments, the Pt/Pd weight ratio is about 2:1. In some embodiments, the Pt/Pd weight ratio is about 3:1. In some embodiments, the Pt/Pd weight ratio is about 5:1. In some embodiments, the Pt/Pd weight ratio is about 10:1.

In some embodiments, the third PGM component is platinum. In some embodiments, the third PGM component is a combination of platinum and palladium. Exemplary weight ratios for such Pt/Pd combinations include weight ratios of from about 10:1 to about 1:10 Pt:Pd, e.g., about 10:1, about 9:1, about 8:1, about 7:1, about 6:1, about 5:1, about 4:1, about 3:1, about 2:1, about 1:1, about 1:2, about 1:3, about 1:4, about 1:5, about 1:6, about 1:7, about 1:8, about 1:9, or about 1:10. In some embodiments, the Pt/Pd weight ratio is about 2:1. In some embodiments, the Pt/Pd weight ratio is about 3:1. In some embodiments, the Pt/Pd weight ratio is about 5:1. In some embodiments, the Pt/Pd weight ratio is about 10:1.

In some embodiments, a PGM component (e.g., a first, second, or third PGM component) is supported on a support material. Reference to a "supported" PGM component means that the PGM component is disposed in or on the support material through association, dispersion, impregnation, or other suitable methods, and may reside on the surface or be distributed throughout the support material. Examples of suitable supports include, but are not limited to, high surface area refractory metal oxides. Such support materials are further described herein below.

Refractory Metal Oxide Support

Oxidation catalyst compositions disclosed herein further comprise at least one refractory metal oxide support material. As used herein, "refractory metal oxide" refers to porous metal-containing oxide materials exhibiting chemical and physical stability at high temperatures, such as the temperatures associated with diesel engine exhaust. Exemplary refractory metal oxides include alumina, silica, zirconia, titania, ceria, and physical mixtures or chemical combinations thereof, including atomically-doped combinations and including high surface area or activated compounds, such as activated alumina. Exemplary aluminas include large pore boehmite, gamma-alumina, and delta/theta alumina. Useful commercial aluminas include activated aluminas, such as high bulk density gamma-alumina, low or medium bulk density large pore gamma-alumina, and low bulk density large pore boehmite and gamma-alumina.

High surface area refractory oxide supports, such as alumina support materials, also referred to as "gamma alumina" or "activated alumina," typically exhibit a BET surface area in excess of 60 $m^2/g$, often up to about 200 $m^2/g$ or higher. Such activated alumina is usually a mixture of the gamma and delta phases of alumina, but may also contain substantial amounts of eta, kappa, and theta alumina phases. "BET surface area" has its usual meaning of referring to the Brunauer, Emmett, Teller (BET) method for determining surface area by $N_2$ adsorption. In some embodiments, the refractory metal oxide support material (e.g., activated alumina) has a specific surface area in the range of about 60 $m^2/g$ to about 350 $m^2/g$, e.g., from about 90 $m^2/g$ to about 250 $m^2/g$.

In some embodiments, the refractory metal oxide support material comprises alumina ($Al_2O_3$), silica ($SiO_2$), zirconia ($ZrO_2$), titania ($TiO_2$), ceria ($CeO_2$), or physical mixtures or chemical combinations of any of the foregoing. Mixed metal oxides include, but are not limited to, zirconia-alumina, ceria-zirconia, ceria-alumina, lanthana-alumina, baria-alumina, and silica-alumina.

In some embodiments, refractory metal oxide supports useful in the oxidation catalyst compositions disclosed herein are doped alumina materials, such as Si-doped alumina materials (including, but not limited to, about 1% to about 10% $SiO_2$—$Al_2O_3$), doped titania materials, such as Si-doped titania materials (including, but not limited to, about 1% to about 10% $SiO_2$—$TiO_2$) or doped zirconia materials, such as Si-doped $ZrO_2$ (including, but not limited to, about 5% to about 30% $SiO_2$—$ZrO_2$). Accordingly, in some embodiments, the refractory metal oxide support material comprises $SiO_2$-doped $Al_2O_3$, $SiO_2$-doped $TiO_2$, or $SiO_2$-doped $ZrO_2$.

The oxidation catalyst composition may comprise any of the above-named refractory metal oxides in any amount. For example, in some embodiments, refractory metal oxides in the catalyst composition may comprise from about 15 wt %, about 20 wt %, about 25 wt %, about 30 wt %, about 35 wt %, about 40 wt %, about 45 wt %, about 50 wt %, about 55 wt %, about 60 wt %, about 65 wt %, about 70 wt %, about 75 wt %, about 80 wt %, about 85 wt %, about 90 wt %, about 95 wt %, or about 99 wt %, based on the total dry weight of the catalyst composition. The catalyst composition may, e.g., comprise from about 10 wt % to about 99 wt % of alumina or $SiO_2$-doped alumina, from about 15 wt % to about 95 wt % of alumina or $SiO_2$-doped alumina, or from about 20 wt % to about 85 wt % of alumina or $SiO_2$-doped alumina.

Reference is made herein to a "first" refractory metal oxide support material, and in some embodiments, a "second" refractory metal oxide support material, and a "third" refractory metal oxide support material, so as to distinguish each refractory metal oxide support material. As described above, the first PGM component is associated with the "first" refractory metal oxide support material. In some embodiments, a second PGM component is associated with a "second" refractory metal oxide support material, and a third PGM component is associated with an optional "third" refractory metal oxide support material. The first, and where present, each of the second and third refractory metal oxide support materials, may be the same or different. In some embodiments, the first and second refractory metal oxide support materials are the same. In some embodiments, the first, second, and third refractory metal oxide support materials are the same. In some embodiment, the first, second, and third refractory metal oxide support materials are each different. In some embodiments, the second and third refractory metal oxide support materials are the same, and are different from the first refractory metal oxide support material.

In some embodiments, the first refractory metal oxide support material comprises alumina, silica, zirconia, titania, ceria, or a combination of any of the foregoing. In some embodiments, the first refractory metal oxide support is selected from the group consisting of gamma alumina, silica doped alumina, ceria doped alumina, zirconia doped alumina, and titania doped alumina. In some embodiments, the first refractory metal oxide support material is selected from the group consisting of gamma alumina and alumina doped with from about 1% to about 20% by weight of $SiO_2$ (such as, e.g., about 1% to about 10% by weight of $SiO_2$). In some embodiments, the first refractory metal oxide support material is alumina doped with from about 1% to about 20% by weight of $SiO_2$. In some embodiments, the first refractory metal oxide support material is alumina doped with from about 1% to about 10% by weight of $SiO_2$, e.g., about 1%, about 2%, about 3%, about 4%, about 5%, about 6%, about 7%, about 8%, about 9%, or about 10% by weight of $SiO_2$. In some embodiments, the first refractory metal oxide support material is alumina.

In some embodiments, the second refractory metal oxide support material comprises alumina, silica, zirconia, titania, ceria, or a combination of any of the foregoing. In some embodiments, the second refractory metal oxide support is selected from the group consisting of gamma alumina, silica doped alumina, ceria doped alumina, zirconia doped alumina, and titania doped alumina. In some embodiments, the second refractory metal oxide support material is selected from the group consisting of gamma alumina and alumina doped with from about 2% to about 20% by weight of $SiO_2$ (such as, e.g., about 2% to about 10% by weight of $SiO_2$). In some embodiments, the second refractory metal oxide support material is alumina doped with from about 2% to about 20% by weight of $SiO_2$. In some embodiments, the second refractory metal oxide support material is alumina doped with from about 2% to about 10% by weight of $SiO_2$, e.g., about 2%, about 3%, about 4%, about 5%, about 6%, about 7%, about 8%, about 9%, or about 10% by weight of $SiO_2$.

In some embodiments, the third refractory metal oxide support material comprises alumina, silica, zirconia, titania, ceria, or a combination of any of the foregoing. In one or more embodiments, the third refractory metal oxide support is selected from the group consisting of gamma alumina, silica doped alumina, ceria doped alumina, zirconia doped alumina, and titania doped alumina. In some embodiments, the third refractory metal oxide support material is selected from the group consisting of gamma alumina and alumina doped with from about 1% to about 20% by weight of $SiO_2$ (such as, e.g., about 1% to about 10% by weight of $SiO_2$). In some embodiments, the third refractory metal oxide support material is alumina doped with from about 1% to about 20% by weight of $SiO_2$. In some embodiments, the third refractory metal oxide support material is alumina doped with from about 1% to about 10% by weight of $SiO_2$, e.g., about 1%, about 2%, about 3%, about 4%, about 5%, about 6%, about 7%, about 8%, about 9%, or about 10% by weight of $SiO_2$.

Manganese Component

In some embodiments, the oxidation catalyst comprises a manganese (Mn) component, wherein the manganese component is supported on the first refractory metal oxide support material. Reference to a "manganese component" is intended to include Mn in various oxidation states, salts, and physical forms, such as, e.g., an oxide. Reference herein to a "supported" manganese component means that the manganese component is disposed in or on the refractory metal oxide support material through association, dispersion, impregnation, or other suitable methods, and may reside on the surface or be distributed throughout the refractory metal oxide support material.

The manganese component can be incorporated into the refractory metal oxide support material in either a bulk form or a surface form, or as a discrete manganese oxide form. In some embodiments, the manganese component is derived from a soluble Mn species, including, but not limited to, Mn salts, such as an acetate salt, nitrate salt, sulfate salt, or a combination of any of the foregoing. It will be appreciated by one of skill in the art that, upon calcination, the Mn species (e.g., a Mn salt) will become one or more forms of manganese oxide ($Mn_xO_y$, where x is 1 or 2, and y is 1, 2, or 3). In some embodiments, the manganese component is obtained from bulk Mn oxides, such as MnO, $Mn_2O$, $MnO_2$, and combinations of any of the foregoing.

In some embodiments, a refractory metal oxide support is impregnated with a Mn salt. As used herein, the term "impregnated" means that a solution containing a Mn species is put into pores of a material such as a refractory metal oxide support. In some embodiments, impregnation of Mn is achieved by incipient wetness, where a volume of a diluted solution containing an Mn species is approximately equal to the pore volume of the support bodies. Incipient wetness impregnation generally leads to a substantially uniform distribution of the solution of the precursor (such as, e.g., a nitrate/acetate or an organic ligand associated with Mn) throughout the pore system of the material. Other methods of adding metals such as Mn are known in the art and can also be used.

Thus, in some embodiments, a refractory metal oxide support is treated with a source of Mn (e.g., a solution of a Mn salt) dropwise, in a planetary mixer, to impregnate the support with the Mn component. In other embodiments, a refractory metal oxide support containing the Mn component can be obtained from commercial sources.

In some embodiments, the manganese component may be supported on the refractory oxide support by co-precipitating a Mn species (e.g., a Mn salt) and a refractory metal oxide support precursor to produce a co-precipitated material, and then calcining the co-precipitated material so that the refractory oxide support material and the manganese component are in a solid solution together. Thus, in some embodiments, mixed oxides containing oxides of manganese, aluminum, cerium, silicon, zirconium, and titanium can be formed.

In some embodiments, the manganese component can be dispersed on the surface of the refractory metal oxide support as discrete manganese oxide particles (e.g., bulk manganese oxides).

The manganese component may be present in the first refractory metal oxide support material over a range of concentrations. In some embodiments, the Mn content is in the range of about 0.1% to about 20% (including about 0.1%, about 0.5%, about 1.0%, about 1.5%, about 2.0%, about 2.5%, about 3.0%, about 4.0%, about 5.0%, about 6.0%, about 7.0%, about 8.0%, about 9.0%, about 10.0%, about 15.0%, and about 20.0%) by weight, based on the weight of the first refractory metal oxide support and calculated as the metal. In some embodiments, the Mn content is in the range of about 3% to about 10% by weight, or about 4% to about 6% by weight, based on the weight of the first refractory metal oxide support.

In some embodiments, the second refractory metal oxide support material, the third refractory metal oxide support material, or both are substantially free of manganese. In some embodiments, any small amounts of manganese which may be present in the second or third washcoats have migrated from the first oxidation catalyst composition washcoat, as may occur in certain layered or zoned article embodiments of this disclosure.

Metal Component

Oxidation catalyst compositions as disclosed herein comprise a metal component comprising yttrium, lanthanum, tin, magnesium, cerium, titanium, or a combination of any of the foregoing. Without intending to be bound by theory, it is thought that manganese interacts beneficially with platinum. Previously, it was reported that the combination of manganese and platinum, wherein platinum is supported on a manganese-containing alumina support, resulted in a synergistic effect to improve NO oxidation (U.S. Pat. No. 10,335,776 to BASF). As reported therein, an unexpected synergy was found whereby manganese promoted the platinum catalyst activity, providing a more effective oxidation catalyst than a catalyst based on platinum alone. The Mn-doped alumina served to stabilize the Pt, resulting in a catalyst composition possessing good $NO_2/NO_x$ performance but did not provide optimal stabilized $NO_2/NO_x$ performance, nor the enhanced low temperature $NO_2/NO_x$ performance desired for the downstream SCR catalyst. Surprisingly, according to the present disclosure, it has been discovered that by adding certain metal components (e.g., yttrium) into a manganese-doped refractory metal oxide support containing platinum, a resulting catalyst composition enables superior low temperature $NO_2/NO_x$ performance compared to a reference catalyst containing only Pt/Mn/$Al_2O_3$. The Pt/Mn/$Al_2O_3$ oxidation catalyst composition further comprising yttrium also provided enhanced stability for the $NO_2/NO_x$ ratio. Without wishing to be bound by theory, it is believed that the metal component interacts with a Mn/Pt complex, stabilizing the zero-valence form of Pt while protecting against sintering, thus preventing Pt particle growth.

The amount of metal component present in the oxidation catalyst composition may vary. In some embodiments, the metal component is present in an amount by weight of from about 0.5% to about 10%, based on the total weight of the composition and calculated as the metal oxide. In some embodiments, the metal component is present in an amount by weight of from about 0.5%, about 0.6%, about 0.7%, about 0.8%, about 0.9%, 1.0%, about 1.5%, about 2.0%, about 2.5%, about 3.0%, about 3.5%, about 4.0%, about 4.5%, about 5.0%, about 5.5%, about 6%, about 6.5%, about 7.0%, about 7.5%, about 8.0%, about 8.5%, about 9%, about 9.5%, or about 10.0%, based on the weight of the composition and calculated as the metal oxide.

In some embodiments, the metal component comprises yttrium, lanthanum, tin, titanium, or a combination of any of the foregoing. The term "metal component" as used herein refers to a metal, salt, ion, compound, or the like which, upon calcination or use of the catalyst, may decompose or otherwise convert to a form such as the corresponding metal or metal oxide. In some embodiments, at least a portion of the metal component is present as the metal oxide, disposed on or in the refractory metal oxide support. These oxides may include various oxidation states of the metal, such as monoxide, dioxide, trioxide, tetroxide, and the like, depending on the valence of the particular metal. In some embodiments, the metal component comprises yttrium. In some embodiments, the metal component is yttrium, such as yttrium in the zero valence state (i.e., yttrium metal), yttrium ions, or compounds thereof, e.g., an oxide thereof (e.g., $Y_2O_3$). In some embodiments, the metal component is $Y_2O_3$.

In some embodiments, the yttrium is present in an amount by weight of from about 0.5% to about 10%, based on the total weight of the composition and calculated as the oxide. In some embodiments, the yttrium is present in an amount by weight of from about 3% to about 6%, based on the total weight of the composition and calculated as the oxide.

In some embodiments, the yttrium concentration can be expressed as a molar ratio to another component of the oxidation catalyst composition, e.g., the manganese component. In some embodiments, a molar ratio of yttrium to manganese is from about 0.1 to about 10, e.g., about 0.1, about 0.2, about 0.3, about 0.4, about 0.5, about 0.6, about 0.7, about 0.8, about 0.9, about 1, about 2, about 3, about 4, about 5, about 6, about 7, about 8, about 9, or about 10. In some embodiments, the molar ratio of yttrium to manganese is from about 0.5 to about 3.

Zeolite

In some embodiments, an adsorbent material, which may be a zeolite, may be included as part of the oxidation catalyst composition in order to adsorb gaseous pollutants, such as hydrocarbons, and retain them during the initial cold-start period. As the exhaust temperature increases, the adsorbed hydrocarbons are driven from the adsorbent and subjected to catalytic treatment at a higher temperature. Thus, in some embodiments, the oxidation catalyst composition comprises a zeolite.

In some embodiments, the zeolite has a framework type selected from the group consisting of ABW, ACO, AEI, AEL, AEN, AET, AFI, AFN, AFO, AFR, AFS, AFT, AFX, AFY, AHT, APC, APD, ASV, ATN, ATO, ATS, ATT, ATV, AVL, AWO, AWW, BCT, BEA, BEC, BIK, BOF, BOG, BOZ, BPH, BRE, BSV, CAN, CAS, CDO, CFI, CGF, CGS, CHA, CHI, CLO, CON, CZP, DAC, DDR, DFO. DFT, DON, EAB, EDI, EEI, EMT, EON, EPI, ERI, ESV, ETR, EUO, EZT, FAU, FER, GIS, GME, GON, GOO, HEU, IFR, IFY, IHW, IMF, IRN, ISV, ITE, ITG, ITH, ITW, IWR, IWS, IWV, IWW, JBW, JRY, JSR, JST, KFI, LAU, LEV, LOV, LTA, LTF, LTL, LTN, MAZ, MEI, MEL, MER, MFI, MFS, MON, MOR, MOZ, MRE, MSE, MTF, MTT, MVY, MTW, MWF, MWW, NAB, NAT, NES, NPO, NPT, NSI, OBW, OFF, OKO, OSI, OSO, OWE, PAR. PAU, PCR, PHI, PON, PUN, RHO, RON, RRO, RSN, RTE, RTH, RWR, RWY, SAF, SAO, SAS, SAT, SAV, SBE, SBS, SBT, SCO, SEW, SFE, SFF, SFG, SFH, SFN, SFO, SFS, SFW, SGF, SIV, SOF, SOS, SSF, SSY, STF, STI, STO, STT, STW, SVR, SZR, TER, THO, TON, TSC, TUN, UEI, UFI, UOS, USI, UTL, UWY, VET, VFI, VNI, VSV, WIE, WEN, YUG, ZON, and mixtures or intergrowths of any of the foregoing.

In some embodiments, the zeolite is a small pore zeolite having a framework type selected from the group consisting of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, ZON, and mixtures or intergrowths of any of the foregoing. For instance, in some embodiments, the small pore zeolite has a framework type selected from the group consisting of CHA, LEV, AEI, AFX, ERI, SFW, KFI, DDR, and ITE.

In some embodiments, the zeolite is a medium pore zeolite having a framework type selected from the group consisting of AEL, AFO, AHT, BOF, BOZ, CGF, CGS, CHI, DAC, EUO, FER, HEU, IMF, ITH, ITR, JRY, JSR, JST, LAU, LOV, MEL, MFI, MFS, MRE, MTT, MVY, MWW, NAB, NAT, NES, OBW, PAR, PCR, PON, PUN, RRO, RSN, SFF, SFG, STF, STI, STT, STW, SVR, SZR, TER, TON, TUN, UOS, VSV, WEI, WEN, and mixtures or intergrowths of any of the foregoing. For instance, in some embodiments, the medium pore zeolite has a framework type selected from the group consisting of FER, MEL, MFI, and ST.

In some embodiments, the zeolite is a large pore zeolite having a framework type selected from the group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths of any of the foregoing. For instance, in some embodiments, the large pore zeolite has a framework type selected from the group consisting of AFI, BEA, MAZ, MOR, and OFF.

The molar ratio of silica-to-alumina ("SAR") of the zeolite can vary over a wide range, but is generally 2 or greater. In some embodiments, the zeolite has a SAR of from about 2 to about 300, such as, e.g., from about 5 to about 250; about 5 to about 200; about 5 to about 100; and about 5 to about 50. In some embodiments, the zeolite has a SAR in the range of about 10 to about 200, about 10 to about 100, about 10 to about 75, about 10 to about 60, about 10 to about 50, about 15 to about 100, about 15 to about 75, about 15 to about 60, and about 15 to about 50, about 20 to about 100, about 20 to about 75, about 20 to about 60, or about 20 to about 50. In some embodiments, the zeolite has a SAR of from about 5 to about 100. In some embodiments, the SAR is from about 2 to about 50. In some embodiments, the SAR is about 25.

The zeolite may further comprise a base metal. Such zeolites may be described as "promoted" with a base metal. When present, the base metal may be selected from the group consisting of iron (Fe), copper (Cu), manganese (Mn), chromium (Cr), cobalt (Co), nickel (Ni), tin (Sn), and mixtures of any of the foregoing. In some embodiments, the base metal is iron. The amount of base metal present in the zeolite may vary. For example, in some embodiments, the zeolite may be promoted with from about 0.1% to about 20% of base metal by weight, determined as the oxide. For example, in some embodiments, the zeolite may be promoted with about 0.1%, about 0.5%, about 1%, about 5%, about 10%, or about 20% of the base metal. In some embodiments, the zeolite may be promoted with from about 0.1% to about 5% of base metal by weight, determined as the oxide.

Alternatively, the zeolite may be substantially free of a base metal. In some embodiments, the zeolite is substantially free of base metal.

As used herein, reference to a "first zeolite" is made to distinguish between additional zeolites (e.g., a "second zeolite") which may also be present in some embodiments. A second zeolite, when present, may be the same or different from the first zeolite.

In some embodiments, the first zeolite comprises a framework type selected from the group consisting of AEI, BEA (Beta zeolites), CHA (chabazite), FAU (zeolite Y), FER (ferrierite), MFI (ZSM-5) and MOR (mordenite). Non-limiting examples of zeolites having these structures include chabazite, faujasite, zeolite Y, ultrastable zeolite Y, beta zeolite, mordenite, silicalite, zeolite X, and ZSM-5. In some embodiments, the first zeolite is ZSM-5, beta zeolite, mordenite, Y zeolite, chabazite, ferrierite, or a combination of any of the foregoing. In some embodiments, the first zeolite is beta zeolite. In some embodiments, the first zeolite is substantially free of base metal.

In some embodiments, the second zeolite is ZSM-5, beta zeolite, mordenite, Y zeolite, chabazite, ferrierite, or a combination of any of the foregoing. In some embodiments, the second zeolite is beta zeolite. In some embodiments, the second zeolite (e.g., beta zeolite) is promoted with iron in an amount of from about 0.5% to about 5% by weight, calculated as the oxide.

In some embodiments, a first or second zeolite may have a SAR of from about 1 to about 1000. In one or more embodiments, the first zeolite has a SAR of about 1, about 2, about 5, about 8, about 10, about 15, about 20, about 25, about 30, about 35, about 40, about 45, about 50, about 60, about 70, about 80 about 90, about 100, about 150, about 200, about 260, about 300, about 400, about 500, about 750, or about 1000.

In some embodiments, the first zeolite has a SAR of from about 10 to about 40.

Preparation of Oxidation Catalyst Compositions

In some embodiments, oxidation catalyst compositions of this disclosure may be prepared via an incipient wetness impregnation method. Incipient wetness impregnation techniques, also called capillary impregnation or dry impregnation are commonly used for the synthesis of heterogeneous materials, i.e., catalysts. Typically, a metal precursor (e.g., a PGM, manganese, or metal component) is dissolved in an aqueous or organic solution and then the metal-containing solution is added to a catalyst support (e.g., a zeolite or a refractory metal oxide) containing the same pore volume as the volume of the solution that was added. Capillary action draws the solution into the pores of the support. Solution added in excess of the support pore volume causes the solution transport to change from a capillary action process to a diffusion process, which is much slower. The catalyst can then be dried and calcined to remove the volatile components within the solution, depositing the metal on the surface of the catalyst support. The maximum loading is limited by the solubility of the precursor in the solution. The concentration profile of the impregnated material depends on the mass transfer conditions within the pores during impregnation and drying. One of skill in the art will recognize other methods for loading the various components (e.g., a PGM, manganese, or metal component) into the supports of the present compositions. e.g., adsorption, ion-exchange, precipitation, and the like.

Oxidation catalyst compositions as disclosed herein generally comprise a PGM component in the form of particles associated with one or more support materials, e.g., refractory metal oxide supports. Methods for dispersing PGM particles on a refractory metal oxide support may vary depending, e.g., on the size range of the PGM particles. According to the present disclosure, an oxidation catalyst composition is generally prepared by associating a colloidal dispersion of PGM particles with a refractory metal oxide support. The dispersal can be achieved during production of the PGM particles (direct dispersion) and/or after production of the PGM particles (subsequent dispersion).

In some embodiments, PGM particles can be dispersed on a refractory metal oxide support materials during production of the PGM particles. One exemplary method for producing PGM particles in a useful size range (e.g., of from about 4 to about 15 nm) is described in PCT International Application Publication No. WO2016/057692, which is incorporated herein by reference in its entirety. Briefly, as disclosed therein, PGM precursors (e.g., salts of PGMs) are combined with a dispersion medium and a polymer suspension stabilizing agent, and the resulting solution is combined with a reducing agent to provide a PGM particle colloidal dispersion. To disperse the PGM particles on a refractory metal oxide support, the refractory metal oxide support material can be added to the dispersion in which PGM particles are formed at any stage of the process (e.g., along with the PGM precursors or along with the reducing agent) to disperse the particles on the refractory metal oxide support material. Prior to this addition, the dispersion of PGM particles can be optionally concentrated or diluted. Methods of impregnating supports with colloidal PGM materials are described in US2017/0304805 to Xu et al. and US2019/0015781 to Wei et al., both of which are incorporated by reference herein in their entirety.

In other embodiments, the PGM particles are isolated and subsequently dispersed on the refractory metal oxide support material. Methods for isolating particles from a dispersion generally are known and, in some embodiments, isolated PGM particles can be obtained by heating and/or applying vacuum to a dispersion containing particles or otherwise processing the dispersion to ensure removal of at least a substantial portion of the solvent therefrom. Following isolation of the PGM particles, the PGM particles and the refractory metal oxide support can be mixed (e.g., with water) to form a dispersion wherein the PGM particles can be dispersed on the refractory metal oxide support material. Such methods, which provide for dispersion on a refractory metal oxide support material after PGM particles are formed, are commonly described as incipient wetness techniques. This process may be repeated several times to achieve a target PGM concentration on the support.

In each instance, the colloidal PGM (e.g., platinum, palladium, or both) is prepared from a PGM precursor by reduction as described above. The PGM precursor can, in some embodiments, be selected from the group consisting of ammine complex salts, hydroxyl salts, nitrates, carboxylic acid salts, ammonium salts, and oxides. In some embodiments, the PGM precursor is selected from $Pt(NH_3)_4(OH)_2$, Pt nitrate, Pd nitrate, Pt citrate, tetraammine palladium nitrate, tetraammine platinum acetate, and the like.

The reducing agent can be any reagent effective to reduce PGMs to metallic (PGM(0)) form and is advantageously soluble in the dispersion medium (e.g., water-soluble).

Although not limited thereto, in some embodiments, the reducing agent may be an organic reducing agent. Non-limiting suitable reducing agents include hydrogen, hydrazine, urea, formaldehyde, formic acid, ascorbic acid, citric acid, glucose, sucrose, xylitol, meso-erythritol, sorbitol, glycerol, maltitol, and oxalic acid. Further, liquid reducing agents such as monovalent alcohols from the group of methanol, ethanol, 1-propanol, iso-propanol, 1-butanol, 2-butanol, 2-methyl-propan-1-ol, allyl alcohol and diacetone alcohol, and mixtures and combinations thereof may be employed. Further suitable liquid reducing agents include divalent alcohols such as ethylene glycol, propylene glycol, diethylene glycol, tetraethylene glycol, and dipropylene glycol. Other non-limiting examples of reducing agents include hydrazine-based reducing agents, such as formic hydrazide and hydroxyethylhydrazine, and natural plant-based polyphenol acids, such as tannic acid and garlic acid. In some embodiments, the reducing agent is ascorbic acid. The reducing agent is usually present in an amount in the range of about 1% to about 10% by weight in the dispersion.

The dispersion medium may be, but is not limited to, at least one polar solvent selected from the group consisting of water, alcohols (including polyols), dimethyl formamide (DMF), and combinations of any of the foregoing. The alcohol may, in some embodiments, be selected from the group consisting of methanol, ethanol, 1-propanol, 2-propanol, 1-butanol, 2-butanol, iso-butanol, hexanol, octanol, and combinations of any of the foregoing. In some embodiments, the alcohol is selected from polyols. The polyol may, in some embodiments, be selected from the group consisting of glycerol, glycol, ethylene glycol, diethylene glycol, triethylene glycol, butanediol, tetraethylene glycol, propylene glycol, polyethylene glycol, polypropylene glycol, 1,2-pentadiol, 1,2-hexadiol, and combinations of any of the foregoing. In some embodiments, the dispersion medium comprises water; accordingly, certain dispersions as disclosed herein can be described as aqueous colloidal dispersions.

The stabilizing agent is typically a polymer suspension stabilizing agent that is soluble in the dispersion medium, used to improve dispersion of the PGM particles (e.g., where the dispersion medium comprises water, the stabilizing agent is typically a water-soluble polymer suspension stabilizing agent). The composition and the size (e.g., weight average-molecular weight, $M_w$) of the polymer can vary. In some embodiments, the polymer has a $M_w$ in the range of about 2,000 to about 2,000,000 Da, such as, e.g., a $M_w$ in the range of about 10,000 to about 60,000 Da (measured using Gel Permeation Chromatography (GPC)). Suitable polymers include, but are not limited to, polyvinyl pyrrolidone (PVP), a copolymer including vinyl pyrrolidone as a first polymerization unit, and a fatty acid-substituted or unsubstituted polyoxyethylene. In some embodiments, polyvinyl pyrrolidone is particularly useful as the polymer suspension stabilizing agent. The polymer suspension stabilizing agent is generally present in an amount in the range of about 0.1 to about 20, such as, e.g., about 5 to about 10, parts by weight based on 100 parts of the dispersion medium by weight.

The refractory metal oxide support material dispersed with PGM particles, prepared according to either method above, is then dried, typically at an elevated temperature (e.g., about 100° C. to about 150° C.) for a period of time (e.g., about 1 hour to about 3 hours). Optionally, a refractory metal oxide support material dispersed with PGM particles is calcined to drive off volatile components. An exemplary calcination process involves heat treatment in air at a temperature in the range of about 400° C. to about 550° C. for about 1 to about 3 hours. The above process can be repeated as needed to reach the desired level of impregnation.

In other embodiments, the PGM component is introduced as a solution of a suitable PGM precursor using, e.g., a wet impregnation method. During the subsequent calcination steps, or at least during the initial phase of use of the composition, such compounds are converted into a catalytically active form of the metal or a compound thereof. Non-limiting examples of suitable compounds include palladium nitrate, tetraammine palladium nitrate, tetraammine platinum acetate, and platinum nitrate. A non-limiting suitable method of preparing an oxidation catalyst composition is to prepare a mixture of a solution of a desired PGM compound (e.g., a platinum compound and/or a palladium compound) and at least one support, such as a finely divided, high surface area, refractory metal oxide support, e.g., silica-doped alumina, which is sufficiently dry to absorb substantially all of the solution to form a wet solid which is later combined with water to form a coatable slurry. In some embodiments, the slurry is acidic, having, e.g., a pH in the range of about 2 to less than about 7. The pH of the slurry may be lowered by the addition of an adequate amount of an inorganic acid or an organic acid to the slurry. Combinations of both can be used when compatibility of acid and raw materials is considered. Inorganic acids include, but are not limited to, nitric acid. Organic acids include, but are not limited to, acetic acid, propionic acid, oxalic acid, malonic acid, succinic acid, glutamic acid, adipic acid, maleic acid, fumaric acid, phthalic acid, tartaric acid, citric acid, and the like. The impregnated refractory metal oxide support material is then dried and calcined as described above.

The wet impregnation method described above can similarly be used to introduce the manganese component, the metal component (e.g., yttrium, lanthanum, tin, magnesium, cerium, titanium, or a combination of any of the foregoing), or both into the refractory metal support material. The impregnations can be conducted in a stepwise fashion or in various combinations. For example, in some embodiments, yttrium is impregnated in a commercially available manganese-doped alumina support material, followed by impregnation or deposition of the PGM component. In other embodiments, the manganese component and the yttrium component may be co-impregnated prior to impregnation or deposition of the PGM component.

Coating Compositions

Coating compositions comprising an oxidation catalyst composition as disclosed herein may be prepared using a binder, e.g., a $ZrO_2$ binder derived from a suitable precursor, such as zirconyl acetate or any other suitable zirconium precursor such as zirconyl nitrate. Zirconyl acetate binder provides a coating that remains homogeneous and intact after thermal aging, e.g., when the catalyst is exposed to high temperatures of at least about 600° C., e.g., about 800° C., and higher water vapor environments of about 5% or more. Other potentially suitable binders include, but are not limited to, alumina and silica. Alumina binders include aluminum oxides, aluminum hydroxides, and aluminum oxyhydroxides. Aluminum salts and colloidal forms of alumina may also be used. Silica binders include, but are not limited to, various forms of $SiO_2$, including silicates and colloidal silica. Binder compositions may include, but are not limited to, any combination of zirconia, alumina, and silica. Other exemplary binders include boehemite, gamma-alumina, or delta/theta alumina, as well as silica sol. When present, the binder is typically used in an amount in the range of about 1 wt % to about 5 wt % of the total washcoat loading.

Alternatively, the binder can be zirconia-based or silica-based, e.g., zirconium acetate, zirconia sol, or silica sol. When present, the alumina binder is typically used in an amount in the range of about 0.05 g/in$^3$ to about 1 g/in$^3$.

Catalytic Articles

In another aspect, this disclosure provides an oxidation catalyst article comprising a substrate having an inlet end and an outlet end defining an overall length, and a catalytic coating comprising one or more washcoats disposed on at least a portion thereof, wherein at least one of said washcoats comprises an oxidation catalyst composition as disclosed herein. Each of the article components is further described herein below.

Substrate

In some embodiments, an oxidation catalyst composition is disposed on a substrate in the form of a washcoat to form a catalytic article. Catalytic articles comprising such substrates are generally employed as part of an exhaust gas treatment system (e.g., catalyst articles including, but not limited to, articles including an oxidation catalyst composition disclosed herein). Useful substrates are 3-dimensional, having a length, a diameter, and a volume, e.g., similar to a cylinder. The shape does not necessarily have to conform to a cylinder. The length is an axial length defined by an inlet end and an outlet end.

In some embodiments, the substrate for the disclosed composition(s) may be constructed of any material typically used for preparing automotive catalysts and will typically possess a metal or ceramic honeycomb structure. The substrate typically provides a plurality of wall surfaces upon which the washcoat composition is applied and adhered, thereby acting as a substrate for the catalyst composition.

Ceramic substrates may be made of any suitable refractory material, e.g. cordierite, cordierite-α-alumina, aluminum titanate, silicon titanate, silicon carbide, silicon nitride, zircon mullite, spodumene, alumina-silica-magnesia, zircon silicate, sillimanite, a magnesium silicate, zircon, petalite, α-alumina, an aluminosilicate, and the like.

Substrates may also be metallic, comprising one or more metals or metal alloys. A metallic substrate may include any metallic substrate, such as those with openings or "punch-outs" in the channel walls. The metallic substrates may be employed in various shapes, such as pellets, compressed metallic fibers, corrugated sheet, or monolithic foam. Non-limiting examples of metallic substrates include heat-resistant, base-metal alloys, especially those in which iron is a substantial or major component. Such alloys may contain one or more of nickel, chromium, and aluminum, and the total of these metals may advantageously comprise at least about 15 wt % of the alloy, e.g., about 10 wt % to about 25 wt % chromium, about 1 wt % to about 8 wt % aluminum, and about 0 wt % to about 20 wt % nickel, in each case based on the weight of the substrate. Non-limiting examples of metallic substrates include: those having straight channels; those having protruding blades along the axial channels to disrupt gas flow and to open communication of gas flow between channels; and those having blades and also holes to enhance gas transport between channels allowing for radial gas transport throughout the monolith.

Any suitable substrate for the catalytic articles disclosed herein may be employed, such as, e.g., a monolithic substrate of the type having fine, parallel gas flow passages extending there through from an inlet or an outlet face of the substrate such that passages are open to fluid flow there through ("flow-through substrate"). Another suitable substrate is of the type having a plurality of fine, substantially parallel gas flow passages extending along the longitudinal axis of the substrate where, typically, each passage is blocked at one end of the substrate body, with alternate passages blocked at opposite end-faces ("wall-flow filter"). Flow-through and wall-flow substrates are also taught, e.g., in PCT International Application Publication No. WO2016/070090, which is incorporated herein by reference in its entirety.

In some embodiments, the catalyst substrate comprises a honeycomb substrate in the form of a wall-flow filter or a flow-through substrate. In some embodiments, the substrate is a wall-flow filter. In some embodiments, the substrate is a flow-through substrate. Flow-through substrates and wall-flow filters will be further discussed herein below.

Flow-Through Substrates

In some embodiments, the substrate is a flow-through substrate (e.g., monolithic substrate, including a flow-through honeycomb monolithic substrate). Flow-through substrates have fine, parallel gas flow passages extending from an inlet end to an outlet end of the substrate such that passages are open to fluid flow. The passages, which are essentially straight paths from their fluid inlet to their fluid outlet, are defined by walls on or in which a catalytic coating is disposed so that gases flowing through the passages contact the catalytic material. The flow passages of the flow-through substrate are thin-walled channels, which can be of any suitable cross-sectional shape and size such as trapezoidal, rectangular, square, sinusoidal, hexagonal, oval, circular, etc. The flow-through substrate can be ceramic or metallic as described above.

Flow-through substrates can, e.g., have a volume of from about 50 in$^3$ to about 1200 in$^3$, a cell density (inlet openings) of from about 60 cells per square inch (cpsi) to about 500 cpsi or up to about 900 cpsi, e.g., from about 200 to about 400 cpsi and a wall thickness of from about 50 to about 200 microns or about 400 microns.

Wall-Flow Filter Substrates

In some embodiments, the substrate is a wall-flow filter, which generally has a plurality of fine, substantially parallel gas flow passages extending along the longitudinal axis of the substrate. Typically, each passage is blocked at one end of the substrate body, with alternate passages blocked at opposite end-faces. Such monolithic wall-flow filter substrates may contain up to about 900 or more flow passages (or "cells") per square inch of cross-section, although far fewer may be used. For example, the substrate may have from about 7 to 600, more usually from about 100 to 400, cells per square inch ("cpsi"). The cells can have cross-sections that are rectangular, square, circular, oval, triangular, hexagonal, or are of other polygonal shapes. The wall-flow filter substrate can be ceramic or metallic as described above.

Figure 2:
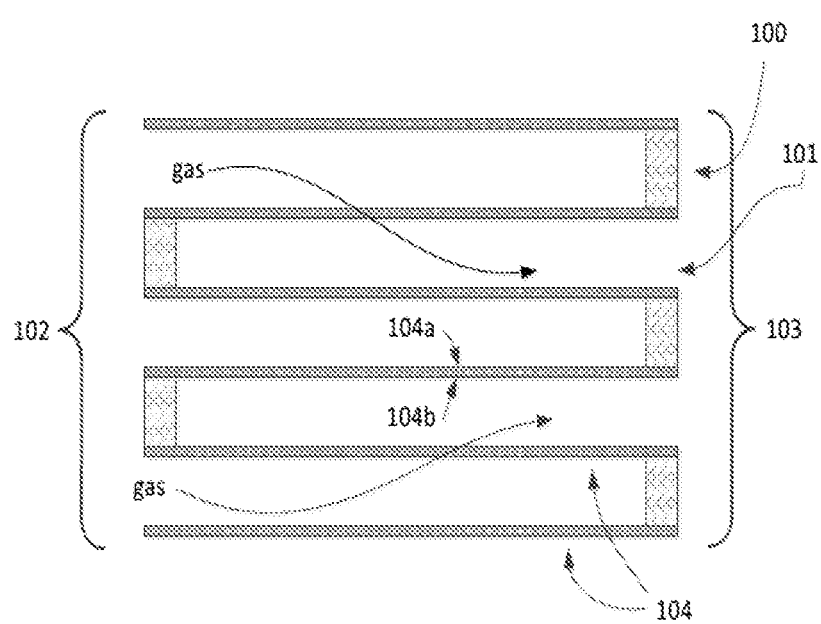
FIG. 2 is a cross-sectional view of a section of an example wall-flow filter substrate.

Referring to FIG. 1, the exemplary wall-flow filter substrate has a cylindrical shape and a cylindrical outer surface having a diameter D and an axial length L. A cross-section view of a monolithic wall-flow filter substrate section is illustrated in FIG. 2, showing alternating plugged and open passages (cells). Blocked or plugged ends 100 alternate with open passages 101, with each opposing end open and blocked, respectively. The filter has an inlet end 102 and an outlet end 103. The arrows crossing porous cell walls 104 represent exhaust gas flow entering the open cell ends, diffusing through the porous cell walls 104, and exiting the open outlet cell ends. Plugged ends 100 prevent gas flow and encourage diffusion through the cell walls. Each cell wall will have an inlet side 104a and outlet side 104b. The passages are enclosed by the cell walls.

The wall-flow filter article substrate may have a volume of, i.e., from about 50 cm$^3$, about 100 in$^3$, about 200 in$^3$, about 300 in$^3$, about 400 in$^3$, about 500 in$^3$, about 600 in$^3$, about 700 in$^3$, about 800 in$^3$, about 900 in$^3$ or about 1000 in$^3$ to about 1500 in$^3$, about 2000 in$^3$, about 2500 in$^3$, about 3000 in$^3$, about 3500 in$^3$, about 4000 in$^3$, about 4500 in$^3$ or about 5000 in$^3$. Wall-flow filter substrates typically have a wall thickness from about 50 microns to about 2000 microns, e.g., from about 50 microns to about 450 microns or from about 150 microns to about 400 microns.

The walls of the wall-flow filter are porous and generally have a wall porosity of at least about 40% or at least about 50% with an average pore diameter of at least about 10 microns prior to disposition of the functional coating. For instance, the wall-flow filter article substrate in some embodiments will have a porosity of ≥40%, ≥50%, ≥60%, ≥65% or ≥70%. For instance, the wall-flow filter article substrate will have a wall porosity of about 50%, about 60%, about 65%, about 70%, or about 75% and an average pore diameter of about 10, about 20, about 30, or about 40 microns prior to disposition of a catalytic coating. The terms "wall porosity" and "substrate porosity" mean the same thing and are interchangeable. Porosity is the ratio of void volume (or pore volume) divided by the total volume of a substrate material. Pore size and pore size distribution are typically determined by Hg porosimetry measurement.

Substrate Coating Process

To produce oxidation catalyst articles of the present disclosure, a substrate as described herein is coated with an oxidation catalyst composition as disclosed herein. The coatings are "catalytic coating compositions" or "catalytic coatings." A "catalyst composition" and a "catalytic coating composition" are synonymous.

Generally, the oxidation catalyst composition is prepared and coated on a substrate as described herein. This method can comprise mixing the catalyst composition (or one or more components of the catalyst composition) as generally disclosed herein with a solvent (e.g., water) to form a slurry for purposes of coating a catalyst substrate. In addition to the catalyst composition, the slurry may optionally contain various additional components. Typical, non-limiting additional components include, but are not limited to, binders as described herein above, additives to control, e.g., pH and viscosity of the slurry. Additional components can include hydrocarbon (HC) storage components (e.g., zeolites), associative thickeners, and/or surfactants (including anionic, cationic, non-ionic or amphoteric surfactants). A typical pH range for the slurry is about 3 to about 6. Addition of acidic or basic species to the slurry can be carried out to adjust the pH accordingly. For example, in some embodiments, the pH of the slurry is adjusted by the addition of aqueous acetic acid.

The slurry can be milled to reduced particle size and to enhance mixing of the particles and formation of a homogenous material. The milling can be accomplished in a ball mill, continuous mill, or other similar equipment, and the solids content of the slurry may be, e.g., about 20 wt % to about 60 wt %, e.g., about 20 wt % to about 40 wt %. In some embodiments, the post-milling slurry possesses a D$_{90}$ particle size in the range of about 1 to about 40 microns, such as, e.g., about 2 to about 20 microns, such as, e.g., about 4 to about 15 microns.

Washcoats

Oxidation catalyst compositions of the disclosure may be applied in the form of one or more washcoats containing an oxidation catalyst composition as disclosed herein. A washcoat is formed by preparing a slurry containing a specified solids content (e.g., about 10% to about 60% by weight) of catalyst composition (or one or more components of the catalyst composition) in a liquid vehicle, which is then applied to a substrate using any washcoat technique known in the art and dried and calcined to provide a coating layer. If multiple coatings are applied, the substrate is dried and/or calcined after each washcoat is applied and/or after the number of desired multiple washcoats are applied. In some embodiments, one or more catalytic materials are applied to the substrate as a washcoat.

A washcoat is generally formed by preparing a slurry containing a specified solids content (e.g., about 30% to about 90% by weight) of catalyst material (here, the PGM, manganese, and metal component supported on a refractory metal oxide support, and optionally including a zeolite) in a liquid vehicle, which is then coated onto the substrate (or substrates) and dried to provide a washcoat layer. To coat the wall-flow substrates with a catalyst material disclosed herein, the substrates can be immersed vertically in a portion of the catalyst slurry such that the top of the substrate is located just above the surface of the slurry. In this manner, slurry contacts the inlet face of each honeycomb wall, but is prevented from contacting the outlet face of each wall. The sample is left in the slurry for about 30 seconds. The substrate is removed from the slurry, and excess slurry is removed from the wall-flow substrate first by allowing it to drain from the channels, then by blowing with compressed air (against the direction of slurry penetration), and then by pulling a vacuum from the direction of slurry penetration. By using this technique, the catalyst slurry permeates the walls of the substrate, yet the pores are not occluded to the extent that undue back pressure will build up in the finished substrate. As used herein, the term "permeate", when used to describe the dispersion of the catalyst slurry on the substrate, means that the catalyst composition is dispersed throughout the wall of the substrate.

Thereafter, the coated substrate is dried at an elevated temperature (e.g., about 100° C. to about 150° C.) for a period of time (e.g., about 1 hour to about 3 hours) and then calcined by heating, e.g., at about 400° C. to about 6000° C., typically for about 10 minutes to about 3 hours. Following drying and calcining, the final washcoat coating layer can be viewed as essentially solvent-free. After calcining, the catalyst loading can be determined through calculation of the difference in coated and uncoated weights of the substrate. As will be apparent to those of skill in the art, the catalyst loading can be modified by altering the slurry rheology. In addition, the coating/drying/calcining process can be repeated as needed to build the coating to the desired loading level or thickness.

After calcining, the catalyst loading obtained by the above described washcoat technique can be determined through calculation of the difference in coated and uncoated weights of the substrate. As will be apparent to those of skill in the art, the catalyst loading can be modified by altering the slurry rheology. In addition, the coating/drying/calcining process to generate a washcoat layer (coating layer) can be repeated as needed to build the coating to the desired loading level or thickness, meaning more than one washcoat may be applied.

In some embodiments, the catalytic article as disclosed herein may be described as comprising a "first washcoat" comprising the oxidation catalyst composition as disclosed herein to distinguish from further washcoats (e.g., a second or third washcoat) which may be present in some embodiments. Such additional washcoats in some embodiments comprise different compositions from each other and/or from the first washcoat.

Second Washcoat

In some embodiments, the catalytic article further comprises a second washcoat disposed on at least a portion of the overall length of the substrate, the second washcoat comprising a second PGM component supported on a second refractory metal oxide support material, and a second zeolite, each as described herein above. In some embodiments, the second washcoat is substantially free of a manganese component. In some embodiments, the second washcoat is substantially free of any manganese component. In some embodiments, the second washcoat is substantially free of any yttrium component. As used herein, "substantially free" with respect to the manganese and yttrium components means that there is no manganese component, no yttrium component, or neither or both intentionally added to the second washcoat layer. In certain embodiments, some migration of the manganese component, the yttrium component, or both may occur, e.g., in layered or zoned embodiments, resulting in the presence of some trace amount (e.g., less than about 0.5% by weight, such as about 0.1%, about 0.01%, about 0.001%, or even about 0% by weight) of either or both component in the second washcoat layer, or, when present, the third washcoat layer.

Third Washcoat

In some embodiments, the catalytic article further comprises a third washcoat disposed on at least a portion of the overall length of the substrate, the third washcoat comprising a third PGM component supported on a third refractory metal oxide support material, each as described above. In some embodiments, the third washcoat is substantially free of a manganese component. In some embodiments, the third washcoat is substantially free of any manganese component. In some embodiments, the third washcoat is substantially free of any yttrium component.

Catalyst Layers and Zones

In some embodiments, an oxidation catalyst article disclosed herein may include the use of one or more washcoat layers and combinations of one or more washcoat layers, wherein at least one washcoat layer comprises an oxidation catalyst composition disclosed herein. The oxidation catalyst article may comprise one or more thin, adherent coating layers (i.e., washcoats) disposed on and in adherence to least a portion of a substrate. The entire coating comprises the individual "coating layers". Catalytic materials may be present on the inlet side of the substrate wall alone, the outlet side alone, both the inlet and outlet sides, or the wall itself may consist all, or in part, of the catalytic material. The catalytic materials, in the form of one or more washcoat layers, may be on the substrate wall surfaces and/or in the pores of the substrate walls, that is "in" and/or "on" the substrate walls. Thus, as used herein, the phrase "a washcoat disposed on the substrate" means on any surface, e.g., on a wall surface and/or on a pore surface.

The washcoat(s) can be applied such that different coating layers may be in direct contact with the substrate. Alternatively, one or more "undercoats" may be present, so that at least a portion of a catalytic coating layer or coating layers are not in direct contact with the substrate (but rather, are in contact with the undercoat). One or more "overcoats" may also be present, so that at least a portion of the coating layer or layers are not directly exposed to a gaseous stream or atmosphere (but rather, are in contact with the overcoat).

Washcoats may be present in many layered arrangements, e.g., in a top coating layer over a bottom coating layer, or in a bottom layer (e.g., in direct contact with the substrate). Any one layer may extend the entire axial length of the substrate, i.e., a bottom layer may extend the entire axial length of the substrate and a top layer may also extend the entire axial length of the substrate over the bottom layer. Each of the top and bottom layers may extend from either the inlet or outlet end.

For example, both bottom and top coating layers may extend from the same substrate end where the top layer partially or completely overlays the bottom layer and where the bottom layer extends a partial or full length of the substrate and where the top layer extends a partial or full length of the substrate. Alternatively, a top layer may overlay a portion of a bottom layer. For example, a bottom layer may extend the entire length of the substrate and the top layer may extend about 10%, about 20%, about 30%, about 40%, about 50%, about 60%, about 70%, about 80%, or about 90% of the substrate length, from either the inlet or outlet end.

Alternatively, a bottom layer may extend about 10%, about 15%, about 25%, about 30%, about 40%, about 45%, about 50%, about 55%, about 60%, about 65%, about 70%, about 75%, about 80%, about 85%, or about 95% of the substrate length from either the inlet end or outlet end and a top layer may extend about 10%, about 15%, about 25%, about 30%, about 40%, about 45%, about 50%, about 55%, about 60%, about 65%, about 70%, about 75%, about 80%, about 85%, or about 95% of the substrate length from either the inlet end of outlet end, wherein at least a portion of the top layer overlays the bottom layer. This "overlay" zone may, e.g., extend from about 5% to about 80% of the substrate length, e.g., about 5%, about 10%, about 20%, about 30%, about 40%, about 50%, about 60%, or about 70% of the substrate length.

In some embodiments, the catalytic coating may be "zoned," comprising zoned catalytic layers, that is, where the catalytic coating contains varying compositions across the axial length of the substrate. This may also be described as "laterally zoned". For example, a layer may extend from the inlet end towards the outlet end extending about 10%, about 20%, about 30%, about 40%, about 50%, about 60%, about 70%, about 80%, or about 90% of the substrate length. Another layer may extend from the outlet end towards the inlet end extending about 10%, about 20%, about 30%, about 40%, about 50%, about 60%, about 70%, about 80%, or about 90% of the substrate length. Different coating layers may be adjacent to each other and not overlay each other. Alternatively, different layers may overlay a portion of each other, providing a third "middle" zone. The middle zone may, e.g., extend from about 5% to about 80% of the substrate length, e.g., about 5%, about 10%, about 20%, about 30%, about 40%, about 50%, about 60%, or about 70% of the substrate length.

Zones of the present disclosure are defined by the relationship of coating layers. With respect to different coating layers, there are a number of possible zoning configurations. For example, there may be an upstream zone and a downstream zone, there may be an upstream zone, a middle zone and a downstream zone, there may four different zones, etc. Where two layers are adjacent and do not overlap, there are upstream and downstream zones. Where two layers overlap to a certain degree, there are upstream, downstream, and middle zones. Where for example, a coating layer extends the entire length of the substrate and a different coating layer extends from the outlet end a certain length and overlays a portion of the first coating layer, there are upstream and downstream zones.

Figure 3A:
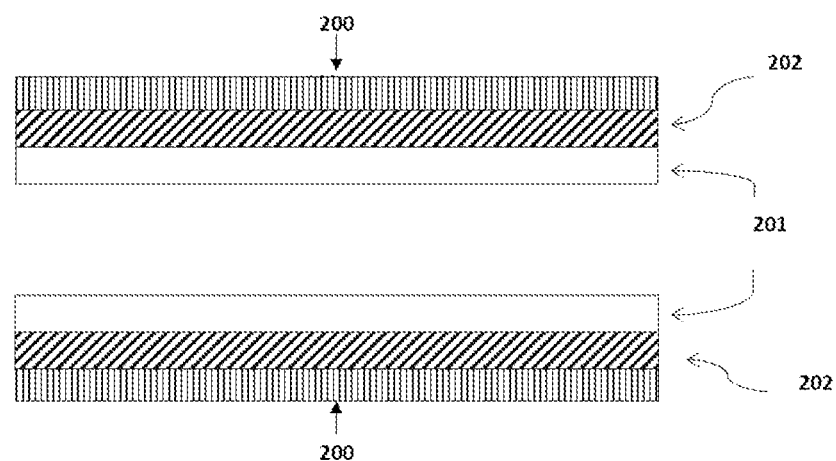
FIG. 3A is a cross-sectional view of an example embodiment of a layered catalytic article of the present disclosure.
Figure 3B:
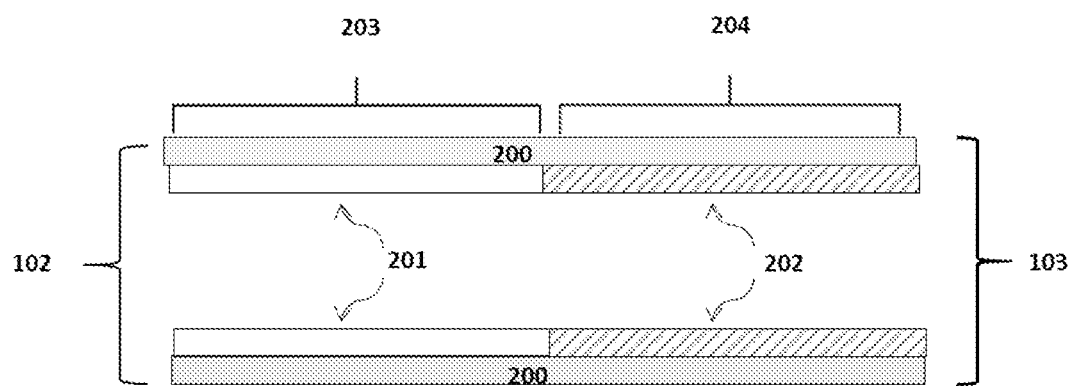
FIG. 3B is a cross-sectional view of an example embodiment of a zoned catalytic article of the present disclosure.
Figure 3C:
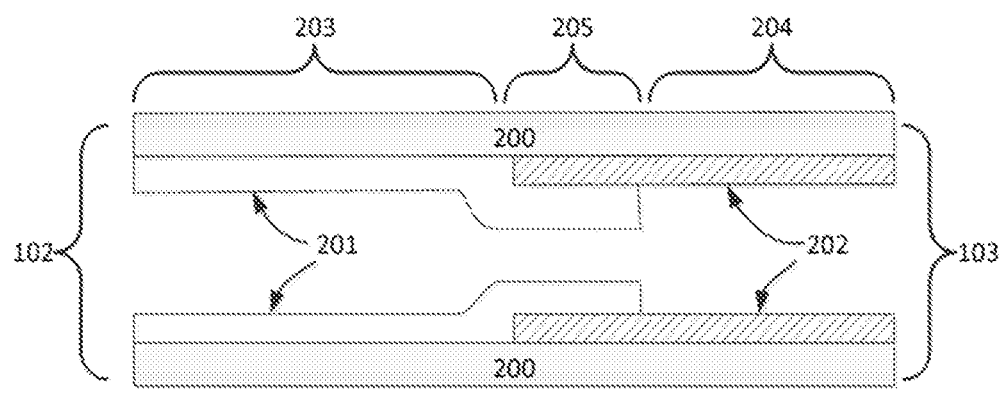
FIG. 3C is a cross-sectional view of an example embodiment of a layered and zoned catalytic article of the present disclosure.

FIGS. 3A, 3B, and 3C show some possible non-limiting coating layer configurations with two coating layers. Shown are substrate walls 200 onto which coating layers 201 and 202 are disposed. This is a simplified illustration, and in the case of a porous wall-flow substrate, not shown are pores and coatings in adherence to pore walls. Also not shown are plugged ends. In FIG. 3A, coating layers 201 and 202 each extend the entire length of the substrate, with top layer 201 overlaying bottom layer 202. The substrate of FIG. 3A does not contain a zoned coating configuration. FIG. 3B is illustrative of a zoned configuration having a coating layer 202 which extends from the outlet end 103 about 50% of the substrate length to form a downstream zone 204, and a coating layer 201 which extends from the inlet end 102 about 50% of the substrate length, providing an upstream zone 203. In FIG. 3C, bottom coating layer 202 extends from the outlet about 50% of the substrate length and top coating layer 201 extends from the inlet greater than 50% of the length and overlays a portion of layer 202, providing an upstream zone 203, a middle overlay zone 205, and a downstream zone 204. FIGS. 3A, 3B, and 3C may be useful to illustrate non-limiting examples of oxidation catalyst composition coatings on a wall-through substrate or a flow-through substrate.

Figure 4A:
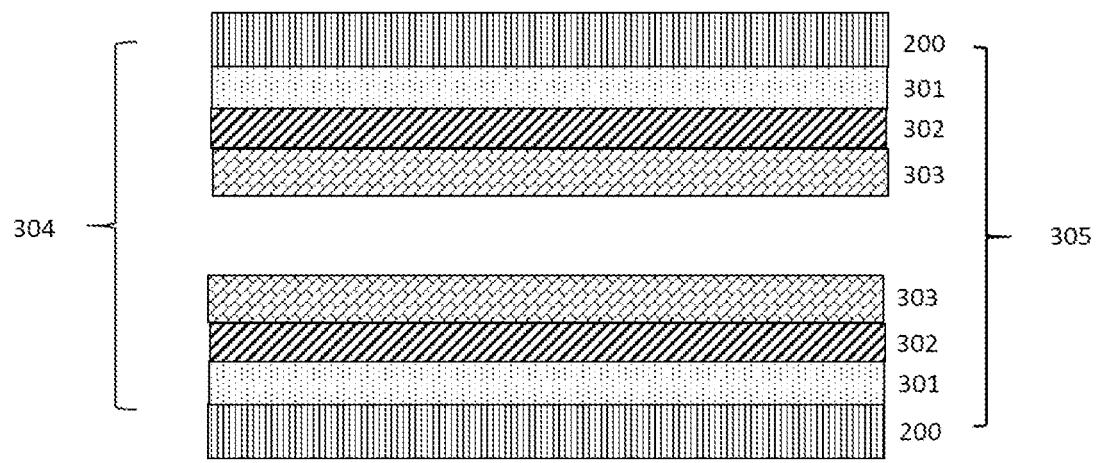
FIG. 4A is a cross-sectional view of another example embodiment of a layered catalytic article of the present disclosure.
Figure 4B:
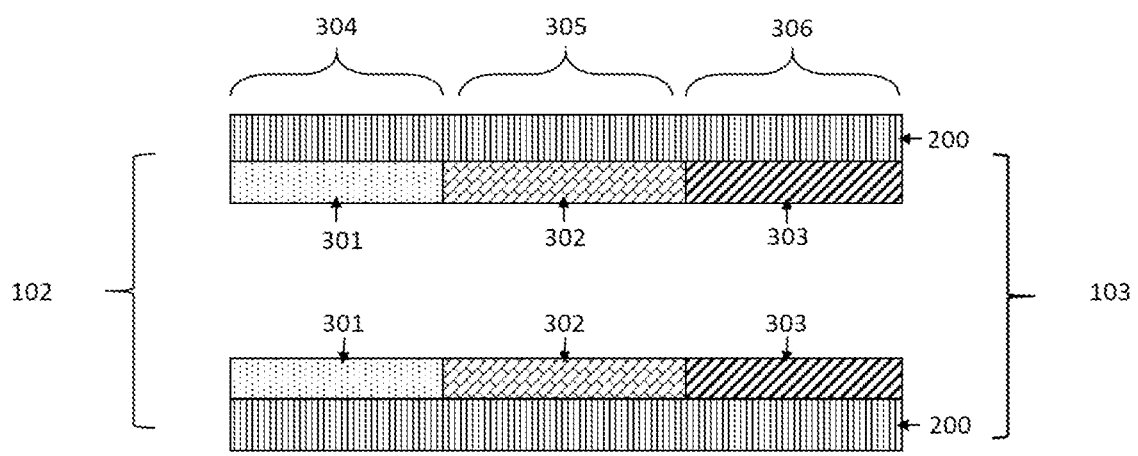
FIG. 4B is a cross-sectional view of another example embodiment of a zoned catalytic article of the present disclosure.
Figure 4C:
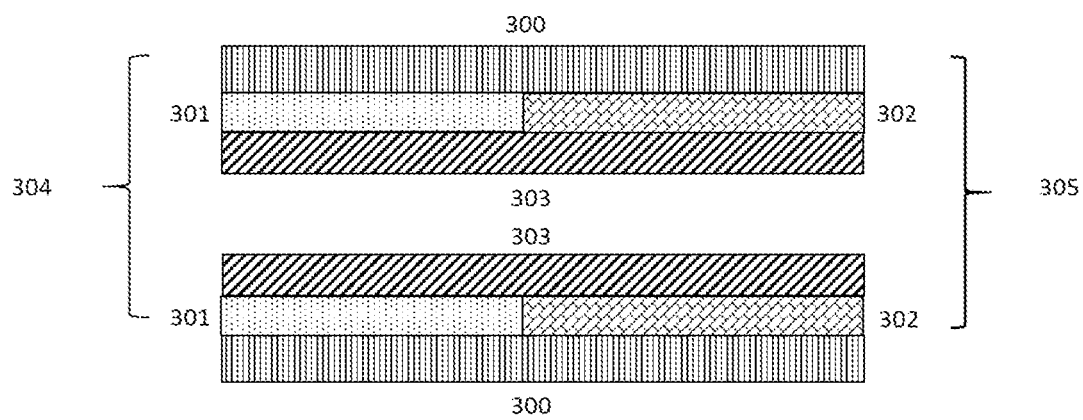
FIG. 4C is a cross-sectional view of another example embodiment of a layered and zoned catalytic article of the present disclosure.
Figure 4D:
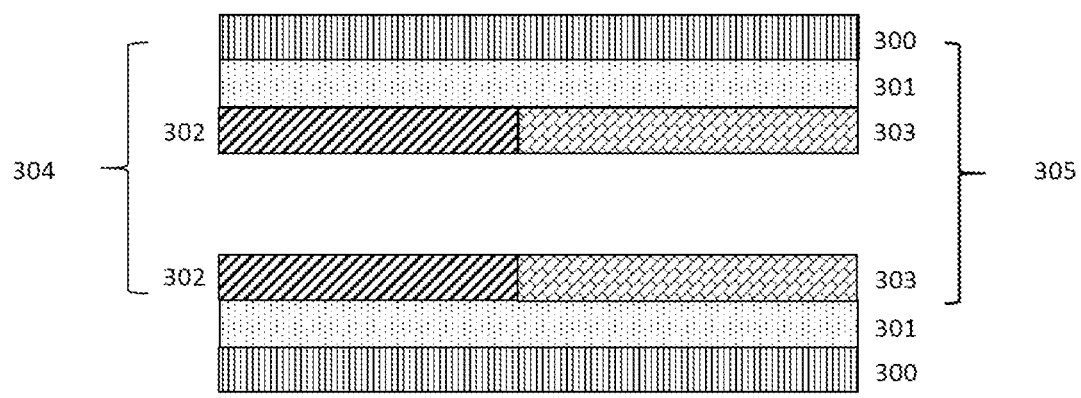
FIG. 4D is a cross-sectional view of another example embodiment of a layered and zoned catalytic article of the present disclosure.

FIGS. 4A, 4B, 4C, and 4D show some possible non-limiting coating layer configurations with three coating layers. Shown are substrate walls 200 or 300 onto which coating layers 301, 302, and 303 are disposed. This is a simplified illustration, and in the case of a porous wall-flow substrate, not shown are pores and coatings in adherence to pore walls. Also not shown are plugged ends. In FIG. 4A, coating layers 301, 302, and 303 each extend the entire length of the substrate, with top layer 303 overlaying middle layer 302, and bottom layer 301. The substrate of FIG. 4A does not contain a zoned coating configuration. FIG. 4B is illustrative of a zoned configuration having a coating layer 303 which extends from the outlet end 103 about 33% of the substrate length to form a downstream zone 306, a coating layer 302 which extends from the downstream zone about 33% of the substrate length to form a middle zone 305, and a coating layer 301 which extends from the inlet end 102 about 33% of the substrate length, providing an upstream zone 304. In FIG. 4C, a first bottom coating layer 302 extends from the outlet about 50% of the substrate length, a second bottom coating layer 301 extends from the inlet about 50% of the substrate length, and a top coating layer 303 extends the entire length of the substrate 300, with top layer 303 overlaying bottom layers 301 and 302. In FIG. 4D, a bottom coating layer 301 extends the entire length of the substrate 300, and a first top coating layer 303 extends from the outlet about 50% of the substrate length, and a second top coating layer 302 extends from the inlet about 50% of the substrate length, overlaying bottom layer 301. FIGS. 4A, 4B, 4C, and 4D may be useful to illustrate non-limiting examples of oxidation catalyst composition coatings on a wall-through substrate or a flow-through substrate.

In any of the zoned arrangements described above, it is noted that the washcoat zones, where adjacent, may be in contact (abutting) or may be separated by a gap (not shown).

In some embodiments, the catalyst article comprises a second washcoat as described herein above. In some embodiments, the coating layers described above and illustrated in FIGS. 3A-C correspond to the first and second washcoats. For example, in some embodiments, the first washcoat is disposed directly on the substrate, and the second washcoat is on at least a portion of the first washcoat. In some embodiments, the second washcoat is disposed directly on the substrate, and the first washcoat is on at least a portion of the second washcoat.

In some embodiments, the first washcoat is disposed on the catalyst substrate from the outlet end to a length from about 10% to about 80% of the overall length, and the second washcoat is disposed on the catalyst substrate from the inlet end to a length from about 20% to about 90% of the overall length. In some embodiments, the first washcoat is disposed on the catalyst substrate from the outlet end to a length of from about 10% to about 50% of the overall length; and wherein the second washcoat is disposed on the catalyst substrate from the inlet end to a length of from about 50% to about 90% of the overall length. In some embodiments, the first washcoat is disposed on the catalyst substrate from the outlet end to a length of about 50% of the overall length, and the second washcoat is disposed on the catalyst substrate from the inlet end to a length of about 50% of the overall length.

In some embodiments, the first washcoat comprising: an oxidation catalyst composition as disclosed herein is disposed on the catalyst substrate from the inlet end to a length of from about 10% to about 80% of the overall length; and a second washcoat comprising a second PGM component supported on a second refractory metal oxide support material and a second zeolite is disposed on the catalyst substrate from the outlet end to a length of from about 20% to about 90% of the overall length.

In some embodiments, the catalyst article comprises a third washcoat as described herein above. In some embodiments, the first, second, and third washcoats layers are arranged in accordance with any of FIGS. 4A-4D as described above. For example, the first, second, and third washcoat may correspond to any of 301, 302, or 303 in any of FIGS. 4A-D. In some embodiments, the first, second, and third washcoats are present in a layered configuration. In some embodiments, the first, second, and third washcoats are present in a zoned configuration. In some embodiments, the first, second, and third washcoats are present in a layered and zoned configuration.

In some embodiments of a layered and zoned configuration, the third washcoat is disposed directly on the substrate, and the first and second washcoats are disposed on at least a portion of the first washcoat. In some embodiments, the third washcoat is disposed directly on the substrate, the first washcoat is disposed on the third washcoat from the outlet end to a length from about 10% to about 80% of the overall length, and the second washcoat is disposed on the third washcoat from the inlet end to a length from about 20% to about 900% of the overall length. In some embodiments, the third washcoat is disposed directly on the substrate, the first washcoat is disposed on the third washcoat from the outlet end to a length from about 50% of the overall length, and the second washcoat is disposed on the third washcoat from the inlet end to a length from about 50% of the overall length.

In some embodiments, the third washcoat is disposed directly on the substrate, the first washcoat is disposed on the third washcoat from the inlet end to a length from about 10% to about 80% of the overall length, and the second washcoat is disposed on the third washcoat from the outlet end to a length from about 20% to about 90% of the overall length. In some embodiments, the third washcoat is disposed directly on the substrate, the first washcoat is disposed on the third washcoat from the inlet end to a length from about 50% of the overall length, and the second washcoat is disposed on the third washcoat from the outlet end to a length from about 50% of the overall length.

Catalyst Loading

Loading of the present catalytic coatings on a substrate will depend on substrate properties such as porosity and wall thickness. Typically, wall-flow filter catalyst loading will be lower than catalyst loadings on a flow-through substrate. Catalyzed wall-flow filters are disclosed, i.e., in U.S. Pat. No. 7,229,597, which is incorporated herein by reference in its entirety. In describing the quantity of washcoat or catalytic metal components or other components of the composition, it is convenient to use units of weight of component per unit volume of catalyst substrate. Therefore, the units, grams per cubic inch ("g/in$^3$"), and grams per cubic foot ("g/ft$^3$"), are used herein to mean the weight of a component per volume of the substrate, including the volume of void spaces of the substrate. Other units of weight per volume, such as g/L, are also sometimes used. Concentration of a catalyst composition, or any other component, on a substrate refers to concentration per any one three-dimensional section or zone, i.e., any cross-section of a substrate or of the entire substrate. The total PGM loading on the catalyst substrate, such as a monolithic flow-through substrate, is typically from about 0.5 to about 200 g/ft$^3$, such as from about 10 g/ft$^3$ to 100 g/ft$^3$.

The PGM loading of each individual washcoat layer may vary. In some embodiments, the first washcoat layer comprises the first PGM component in a total amount of from about 10 to about 100 g/ft$^3$. In some embodiments, the second washcoat layer comprises the second PGM component in a total amount of from about 10 to about 100 g/ft$^3$. In some embodiments, the third washcoat layer comprises the third PGM component in a total amount of from about 10 to about 100 g/ft$^3$.

The quantity of zeolite, when present, in each individual washcoat layer may vary. In some embodiments, the first washcoat layer comprises a first zeolite in a total amount of from about 0.1 to about 1 g/in$^3$, e.g., about 0.3 to about 0.8 g/in$^3$. In some embodiments, the first washcoat layer comprises a first zeolite in a total amount of about 0.5 g/in$^3$.

In some embodiments, the second washcoat layer comprises a second zeolite in a total amount of from about 0.1 to about 1 g/in$^3$, e.g., about 0.3 to about 0.8 g/in$^3$. In a specific embodiment, the second washcoat layer comprises a zeolite in a total amount of about 0.5 g/in$^3$.

It is noted that these weights per unit volume are typically calculated by weighing the catalyst substrate before and after treatment with the catalyst washcoat composition, and since the treatment process involves drying and calcining the catalyst substrate at high temperature, these weights represent an essentially solvent-free catalyst coating as essentially all of the water of the washcoat slurry has been removed.

Catalyst Activity

In some embodiments, the level of hydrocarbons, e.g., methane, or CO present in the exhaust gas stream is reduced compared to the level of hydrocarbons or CO present in the exhaust gas stream prior to contact with the catalyst article. In some embodiments, the efficiency for reduction of HC and/or CO level is measured in terms of the conversion efficiency. In some embodiments, conversion efficiency is measured as a function of light-off temperature (i.e., $T_{50}$ or $T_{70}$). The $T_{50}$ or $T_{70}$ light-off temperature is the temperature at which the catalyst composition is able to convert 50% or 70%, respectively, of hydrocarbons or carbon monoxide to carbon dioxide and water. Typically, the lower the measured light-off temperature for any given catalyst composition, the more efficient the catalyst composition is at carrying out the catalytic reaction, e.g., hydrocarbon conversion. In some embodiments, the oxidation catalyst article, after degreening at about 590° C., has a first CO $T_{50}$; and after aging at about 800° C. for about 16 hours, has a second CO $T_{50}$; wherein the difference between the first and second $T_{50}$ value is about 19° C. or less. In some embodiments, the oxidation catalyst article, after degreening at about 590° C., has a first HC $T_{70}$; and after aging at about 800° C. for about 16 hours, has a second HC $T_{70}$; wherein the difference between the first and second $T_{70}$ value is about 10° C. or less.

In some embodiments, the oxidation catalyst article, after degreening at about 590° C., has a first $NO_2$ yield; and after aging at about 800° C. for about 16 hours, has a second $NO_2$ yield; wherein the difference between the first and second $NO_2$ yield is less than about 20%.

Exhaust Gas Treatment Systems

In a further aspect, this disclosure provides an exhaust gas treatment system comprising an oxidation catalyst article as disclosed herein, wherein the oxidation catalyst article is downstream of and in fluid communication with an internal combustion engine. The engine can be, e.g., a diesel engine which operates at combustion conditions with air in excess of that required for stoichiometric combustion, i.e., lean conditions. In some embodiments, the engine can be a gasoline engine (e.g., a lean burn gasoline engine) or an engine associated with a stationary source (e.g., electricity generators or pumping stations). Exhaust gas treatment systems generally contain more than one catalytic article positioned downstream from the engine in fluid communication with the exhaust gas stream. A system may contain, i.e., an oxidation catalyst article as disclosed herein (e.g., a DOC), a selective catalytic reduction catalyst (SCR), and one or more articles including a reductant injector, a soot filter, an ammonia oxidation catalyst ($AMO_x$), or a lean $NO_x$ trap (LNT). An article containing a reductant injector is a reduction article. A reduction system includes a reductant injector and/or a pump and/or a reservoir, etc. The present treatment system may further comprise a soot filter and/or an ammonia oxidation catalyst. A soot filter may be uncatalyzed or may be catalyzed, such as a CSF as disclosed herein. For instance, a treatment system may comprise, from upstream to downstream—an article containing a DOC, a CSF, a urea injector, a SCR article, and an article containing an $AMO_x$. A lean $NO_x$ trap (LNT) may also be included.

The relative placement of the various catalytic components present within the emission treatment system can vary. In the present exhaust gas treatment systems and methods, the exhaust gas stream is received into the article(s) or treatment system by entering the upstream end and exiting the downstream end. The inlet end of a substrate or article is synonymous with the "upstream" end or "front" end. The outlet end is synonymous with the "downstream" end or "rear" end. The treatment system is, in general, downstream of and in fluid communication with an internal combustion engine.

Figure 5:
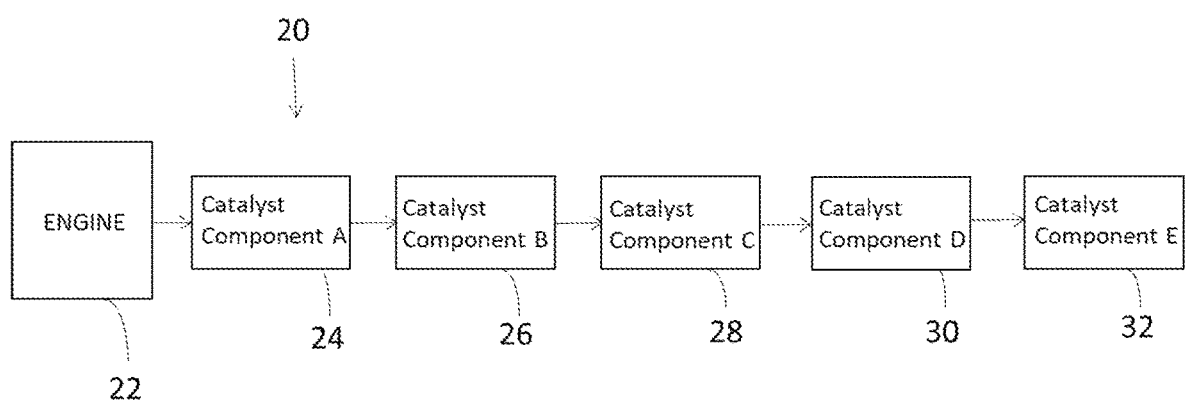
FIG. 5 is a schematic depiction of an example embodiment of an emission treatment system in which a DOC catalyst article of the present disclosure is utilized.

One exemplary emission treatment system is illustrated in FIG. 5, which depicts a schematic representation of an emission treatment system 20. As shown in FIG. 5, the emission treatment system can include a plurality of catalyst components in series downstream of an engine 22, such as a lean burn engine. At least one of the catalyst components will comprise the oxidation catalyst composition of the disclosure as set forth herein (e.g., a DOC, a CSF, or both). The oxidation catalyst composition of the disclosure could be combined with numerous additional catalyst materials and could be placed at various positions in comparison to the additional catalyst materials. FIG. 4 illustrates five catalyst components, 24, 26, 28, 30, 32 in series; however, the total number of catalyst components can vary and five components is merely one example.

Without limitation, Table 1 presents various exhaust gas treatment system configurations of one or more embodiments. It is noted that each catalyst is connected to the next catalyst via exhaust conduits such that the engine is upstream of catalyst A, which is upstream of catalyst B, which is upstream of catalyst C, which is upstream of catalyst D, which is upstream of catalyst E (when present). The reference to Components A-E in Table 1 can be cross-referenced with the same designations in FIG. 5.

The LNT catalyst noted in Table 1 can be any catalyst conventionally used as a $NO_x$ trap, and typically comprises $NO_x$-adsorber compositions that include base metal oxides (e.g., BaO, MgO, $CeO_2$, and the like) and a platinum group metal for catalytic NO oxidation and reduction (e.g., Pt and Rh).

The LT-NA catalyst noted in Table 1 can be any catalyst that can adsorb $NO_x$ (e.g., NO or $NO_2$) at low temperatures (less than about 250° C.) and release it to the gas stream at high temperatures (greater than about 250° C.). The released $NO_x$ is generally converted to $N_2$ and $H_2O$ over a downstream SCR or SCRoF catalyst. Typically, a LT-NA catalyst comprises Pd-promoted zeolites or Pd-promoted refractory metal oxides.

Reference to SCR in the table refers to an SCR catalyst. Reference to SCRoF (or SCR on filter) refers to a particulate or soot filter (e.g., a wall-flow filter), which can include an SCR catalyst composition.

Reference to $AMO_x$ in the table refers to an ammonia oxidation catalyst, which can be provided downstream of the catalyst of one more embodiments of the disclosure to remove any slipped ammonia from the exhaust gas treatment system. In some embodiments, the $AMO_x$ catalyst may comprise a PGM component. In some embodiments, the $AMO_x$ catalyst may comprise a bottom coat with a PGM component and a top coat with SCR functionality.

As recognized by one skilled in the art, in the configurations listed in Table 1, any one or more of components A, B, C, D, or E can be disposed on a particulate filter, such as a wall-flow filter, or on a flow-through honeycomb substrate. In some embodiments, an engine exhaust system comprises one or more catalyst compositions mounted in a position near the engine (in a close-coupled position, CC), with additional catalyst compositions in a position underneath the vehicle body (in an underfloor position, UF). In some embodiments, the exhaust gas treatment system may further comprise a urea injection component.

TABLE 1

Non-Limiting Examples of Exhaust Gas Treatment System Configurations

| Component A | Component B | Component C | Component D | Component E |
|---|---|---|---|---|
| DOC | LT-NA | CSF | SCR | Optional AMOx |
| LT-NA | DOC | CSF | SCR | Optional AMOx |
| DOC | LT-NA | SCR | CSF | Optional AMOx |
| LT-NA | DOC | SCR | CSF | Optional AMOx |
| LT-NA/ DOC | CSF | SCR | Optional AMOx | — |
| LT-NA/ DOC | SCRoF | Optional | — | — |
| DOC | | AMOx | | |
| LT-NA/ DOC | LNT | SCR | Optional AMOx | — |
| DOC | LT-NA/ DOC | SCR | Optional AMOx | — |
| DOC | LT-NA/ DOC | LNT | SCR | Optional AMOx |

Methods of Treating an Exhaust Gas Stream

Some aspects of the current disclosure are directed towards a method for treating an engine exhaust gas stream comprising hydrocarbons and/or carbon monoxide and/or NON, the method comprising contacting the exhaust gas stream with a catalytic article of the present disclosure, or an emission treatment system of the present disclosure.

In general, hydrocarbons (HCs) and carbon monoxide (CO) present in the exhaust gas stream of any engine can be converted to carbon dioxide and water. Typically, hydrocarbons present in engine exhaust gas stream comprise $C_1$-$C_6$ hydrocarbons (i.e., lower hydrocarbons), such as methane, although higher hydrocarbons (greater than $C_6$) can also be detected. In some embodiments, the method comprises contacting the exhaust gas stream with a catalytic article or an exhaust gas treatment system of the present disclosure for a time and at a temperature sufficient to reduce the levels of CO and/or HC in the exhaust gas stream.

In general, $NO_x$ species such as NO present in the exhaust gas stream of any engine can be converted (oxidized) to $NO_2$. In some embodiments, the method comprises contacting the gas stream with a catalytic article or an exhaust gas treatment system of the present disclosure, for a time and at a temperature sufficient to oxidize at least a portion of the NO present in the gas stream to $NO_2$.

The present articles, systems, and methods are suitable for treatment of exhaust gas streams from mobile emissions sources such as trucks and automobiles. The present articles, systems, and methods are also suitable for treating exhaust streams from stationary sources such as power plants.

It will be readily apparent to one of ordinary skill in the relevant arts that suitable modifications and adaptations to the compositions, methods, and applications described herein can be made without departing from the scope of any embodiments or aspects thereof. The compositions and methods provided are exemplary and are not intended to limit the scope of the claimed subject matter. All of the various embodiments, aspects, and options disclosed herein can be combined in all variations. The scope of the compositions, formulations, methods, and processes described herein include all actual or potential combinations of embodiments, aspects, options, examples, and preferences herein. All patents and publications cited herein are incorporated by reference herein for the specific teachings thereof as noted unless other specific statements of incorporation are specifically provided.

EXAMPLES

The present disclosure is more fully illustrated by the following examples, which are set forth to illustrate certain exemplary embodiments and is not to be construed as limiting thereof. Unless otherwise noted, all parts and percentages are by weight, and all weight percentages are expressed on a dry basis, meaning excluding water content, unless otherwise indicated.

Example 1: 2% Pt on Mn-Containing Alumina Support (Reference)

A reference composition was prepared containing Pt on Mn-impregnated alumina. An alumina support containing about 5% Mn by weight was added into a Pt compound solution (prepared as disclosed in US2017/0304805) to prepare a slurry with about a 30% solids concentration. This slurry was then milled for about 10 minutes. The milled powder was dried and calcined at about 590° C. The resulting dry powder was crushed and sieved to a particle size $D_{90}$ of less than about 10 microns. The sieved powder was divided into two portions. The first portion was used as is ("fresh"). The second portion was aged at about 800° C. in air containing about 10% steam.

Example 2: 2% Pt on Y/Mn-Containing Alumina Support (Inventive)

An inventive composition was prepared containing Pt on Yttrium- and Mn-impregnated alumina. An alumina support containing about 5% Mn by weight was impregnated with yttrium nitrate, then dried and calcined at about 500° C. for about 2 hours. The resulting Y/Mn-alumina contained about 2% Y and about 5% Mn by weight. The Y/Mn—Al support was then added into a Pt compound solution (prepared as disclosed in US2017/0304805) to prepare a slurry with about a 30% solids concentration. The milled powder was dried and calcined at about 590° C. The resulting dry powder was crushed and sieved to a particle size $D_{90}$ of less than about 10 microns. The sieved powder was divided into two portions. The first portion was used as is ("fresh"). The second portion was aged at about 800° C. in air containing about 10% steam.

Example 3. Reactor Testing of Powder Samples

Samples of the impregnated support materials of Examples 1 and 2 were evaluated under steady state conditions with heavy hydrocarbons (HC) in the feed gas. About 100 mg of the above sieved and aged powders were diluted with corundum and filled into the reactor testing holders (about 1 millimeter) respectively. A standard steady-state light-off (L/O) test was conducted on these powders, with a feed gas concentration as follows: about 700 ppm CO; about 80 ppm-$C_1$; $C_3H_6$ about 340 ppm-$C_1$ decane/toluene (about 2/1 ratio on $C_1$ basis); about 80 ppm NO; about 10% $O_2$; about 10% $CO_2$; and about 5% $H_2O$. Results for these studies are provided in Tables 2 to 5 below. Table 2 shows the CO and HC light-off results. Table 3 shows the $NO_2$ yield results at about 225° C. and about 250° C. Table 4 shows the $NO_2$ yield stability between fresh and aged catalysts, at about 225° C. and about 250° C. Table 5 shows the CO/HC L/O stability between fresh and aged catalysts.

TABLE 2

| CO and HC Light-Off (L/O) Results | | |
|---|---|---|
| Example # | $CO_{50}$ L/O, ° C. | $HC_{70}$ L/O, ° C. |
| Fresh (590° C. calcined powder) | | |
| Example 1 (Reference) | 150 | 187 |
| Example 2 (Inventive) | 158 | 190 |
| Aged (800° C./16 hours/10% steam) | | |
| Example 1 (Reference) | 179 | 200 |
| Example 2 (Inventive) | 177 | 200 |

TABLE 3

| $NO_2$ Yield Results | | |
|---|---|---|
| | $NO_2$ yield, % | |
| | $NO_2$ yield at 225° C., % | $NO_2$ yield at 250° C., % |
| Fresh (590° C. calcined powder) | | |
| Example 1 (Reference) | 77 | 82 |
| Example 2 (Inventive) | 72 | 82 |
| Aged (800° C./16 hours/10% steam) | | |
| Example 1 (Reference) | 52 | 63 |
| Example 2 (Inventive) | 57 | 67 |

TABLE 4

| $NO_2$ Yield Stability between Fresh and Aged Catalysts at 225° C. and 250° C. | | |
|---|---|---|
| Example # | $NO_2$ Stability at 225° C., % | $NO_2$ stability at 250° C., % |
| Example 1 (Reference) | 25 | 19 |
| Example 2 (Inventive) | 15 | 15 |

TABLE 5

| CO/HC L/O Stability between Fresh and Aged Catalysts | | |
|---|---|---|
| Example # | $CO_{50}$ L/O, ° C. | $HC_{70}$ L/O, ° C. |
| Example 1 (Reference) | 29 | 13 |
| Example 2 (Inventive) | 19 | 10 |

Data in Tables 2 to 5 illustrate that yttrium addition to a Mn-containing alumina support enhanced the stability of the catalyst toward aging (i.e., similar performance was obtained between fresh and aged samples, for either CO/HC L/O or $NO_2$ yield). Furthermore, yttrium addition enhanced aged performance in CO/HC light-off. Moreover, yttrium addition enhanced the aged $NO_2$ yield at low temperatures, which is an important feature in reducing cold start $NO_x$ emissions (e.g., by enhancing the downstream SCR $NO_x$ reduction performance).

Example 4: Reactor Testing of the Powder Samples

To further confirm the stability observed for Pt on the Y/Mn-containing support, samples of impregnated support materials of Examples 1 and 2 were evaluated under steady state conditions without heavy (>C6) HC in the feed gas, but with a higher NO concentration present. The same powders evaluated in Example 3 were tested again with this new feed gas composition, which contained: about 700 ppm CO; about 240 ppm-$C_1$ $C_3H_6$; about 210 ppm NO; about 10% $O_2$; about 10% $CO_2$; and about 5% $H_2O$.

Results for these studies are provided in Tables 6 to 9 below. Data in Table 6 provide CO and HC light-off results. Table 7 provides $NO_2$ yield results at about 225° C. and about 250° C. Table 8 provides data for $NO_2$ yield stability between fresh and aged catalysts at about 225° C. and about 250° C. Data in Table 9 demonstrate the CO/HC L/O stability between fresh and aged catalysts.

TABLE 6

CO and HC light-off results.

| Example # | $CO_{50}$ L/O, ° C. | $HC_{70}$ L/O, ° C. |
|---|---|---|
| Fresh (590° C. calcined powder) | | |
| Example 1 (Reference) | 166 | 207 |
| Example 2 (Inventive) | 188 | 211 |
| Aged (800° C./16 hours/10% steam) | | |
| Example 1 (Reference) | 203 | 228 |
| Example 2 (Inventive) | 194 | 224 |

TABLE 7

$NO_2$ yield results at 225 and 250° C.

| Example # | $NO_2$ yield at 225° C., % | $NO_2$ yield at 250° C., % |
|---|---|---|
| Fresh (590° C. calcined powder) | | |
| Example 1 (Reference) | 40 | 51 |
| Example 2 (Inventive) | 39 | 55 |
| Aged (800° C./16 hours/10% steam) | | |
| Example 1 (Reference) | 4 | 32 |
| Example 2 (Inventive) | 16 | 35 |

TABLE 8

$NO_2$ yield stability between fresh and aged catalysts at 225 and 250° C.

| Example # | $NO_2$ Stability at 225° C., % | $NO_2$ stability at 250° C., % |
|---|---|---|
| Example 1 (Reference) | 36 | 19 |
| Example 2 (Inventive) | 23 | 20 |

TABLE 9

CO/HC L/O stability between fresh and aged catalysts

| Example # | $CO_{50}$ L/O, ° C. | $HC_{70}$ L/O, ° C. |
|---|---|---|
| Example 1 (Reference) | 37 | 21 |
| Example 2 (Inventive) | 6 | 13 |

Data provided in Tables 6 to 9 further demonstrate that yttrium addition to a Mn-containing alumina support enhanced the stability of the catalyst performance to aging for either CO/HC L/O or $NO_2$ yield, especially at low temperature. The aged $NO_2$ yield at low temperatures for inventive Example 2 was notably better relative to the non-Y-containing reference composition (Example 1), and stability of the $NO_2$ yield at low temperature was greatly improved for the inventive example.

Examples 5-7: Comparative Examples and Data for Pt/Alumina and Pt/Y/Alumina

To demonstrate the unique Y—Mn synergism for enhancement of activity and stability in the inventive Pt/Mn/Y/alumina Example 2, reference examples were prepared and evaluated with Pt supported alumina and Y-impregnated alumina supports which did not include Mn (i.e., supports substantially free of Mn).

Example 5: 2% Pt on Alumina Support (Reference)

A reference composition was prepared containing Pt on alumina. An alumina support was added into a Pt compound solution (prepared as disclosed in US2017/0304805) to prepare a slurry with about a 30% solids concentration. This slurry was then milled for about 10 minutes. The milled powder was dried and calcined at about 590° C. The resulting dry powder was crushed and sieved to a particle size $D_{90}$ of less than about 10 microns. The sieved powder was divided into two portions. The first portion was used as is ("fresh"). The second portion was aged at about 800° C. in air containing about 10% steam.

Example 6: 2% Pt on Y-Alumina Support (Reference)

A reference composition was prepared containing Pt on Y-impregnated alumina. An alumina support was impregnated with yttrium nitrate, then dried and calcined at about 500° C. for about 2 hours. The resulting Y/alumina contained about 2% Y by weight. The Y/alumina support was then added into a Pt compound solution (prepared as disclosed in US2017/0304805) to prepare a slurry with about a 30% solids concentration. The milled powder was dried and calcined at about 590° C. The resulting dry powder was crushed and sieved to a particle size $D_{90}$ of less than about 10 microns. The sieved powder was divided into two portions. The first portion was used as is ("fresh"). The second portion was aged at about 800° C. in air containing about 10% steam.

Example 7 Reactor Testing of the Powder Samples

To further confirm the stability observed for Pt on the Y/Mn-containing support, samples of impregnated support materials of Examples 5 and 6 were evaluated under steady state conditions using the same feed gas composition as Example 4. Results for these studies are provided in Tables 10 to 12 below. Data in Table 10 provide CO and HC light-off results. Table 11 provides $NO_2$ yield results at about 225° C. and about 250° C. Table 12 provides data for $NO_2$ yield stability between fresh and aged catalysts at about 225° C. and about 256° C.

TABLE 10

CO and HC Light-Off Results

| Example # | $CO_{50}$ L/O, ° C. | $HC_{70}$ L/O, ° C. |
|---|---|---|
| Fresh (590° C. calcined powder) | | |
| Example 5 (Reference) | 167 | 193 |
| Example 6 (Reference) | 168 | 192 |

TABLE 10-continued

CO and HC Light-Off Results

| Example # | $CO_{50}$ L/O, ° C. | $HC_{70}$ L/O, ° C. |
|---|---|---|
| Aged (800° C./16 hours/10% steam) | | |
| Example 5 (Reference) | 195 | 214 |
| Example 6 (Reference) | 196 | 216 |

TABLE 11

$NO_2$ Yield Results at 225° C. and 250° C.

| Example # | $NO_2$ yield at 225° C., % | $NO_2$ yield at 250° C., % |
|---|---|---|
| Fresh (590° C. calcined powder) | | |
| Example 5 (Reference) | 36 | 49 |
| Example 6 (Reference) | 39 | 52 |
| Aged (800° C./16 hours/10% steam) | | |
| Example 5 (Reference) | 14 | 30 |
| Example 6 (Reference) | 12 | 28 |

TABLE 12

$NO_2$ Yield Stability between Fresh and Aged Catalysts at 225° C. and 250° C.

| Example # | $NO_2$ Stability at 225° C., % | $NO_2$ stability at 250° C., % |
|---|---|---|
| Example 5 (Reference) | 22 | 19 |
| Example 6 (Reference) | 27 | 24 |

Data in Table 10 to 12 for comparative Examples 5 and 6 demonstrated that adding only Y to the alumina support did not generate the needed $NO_2$ yield stability between fresh and aged samples (reference Example 6, containing Y, performed worse than reference Example 5, without Y). This result confirmed the unexpected synergism between Pt, Y, and Mn on an alumina support for stabilizing $NO_2$ yield performance.

Example 8; Oxidation Catalyst Article (Full-Size Reference Article)

A full-size reference oxidation catalyst article was prepared. The article consisted of a ceramic support with a volume of 1.65 L that was coated over the full length with a bottom coat slurry, an inlet zone top coat slurry that was coated over 50% of the length, and an outlet zone top coat slurry that was also coated over 50% of the length.
Bottom Coat (1.3% Pt/0.65% Pd on Alumina)
For the bottom coat slurry, a Pt and Pd compound solution was impregnated on an alumina support (doped with about 5% Si), resulting in a solid concentration of about 35%. This slurry was milled to a particle size $D_{90}$ between about 18 and about 21 microns.
Top Inlet Zone Coat (1.4% Pt/1.4% Pd on Alumina)
The inlet zone top coat slurry was prepared by an impregnation of an alumina support (doped with about 5% Si) with a Pt and Pd compound solution resulting in a slurry with a solids concentration of about 38%, followed by the addition of Beta zeolite (about 50% by weight of the total washcoat loading) and a milling step with a $D_{90}$ target value between about 15 and about 21 microns.
Top Outlet Zone Coat (5.6% Pt on Mn-alumina; Zeolite)
For the preparation of the outlet zone top coat slurry, a Mn-containing alumina support (about 5% Mn by weight) was added into the Pt compound solution, followed by the addition of Beta zeolite (about 20% by weight of the total washcoat loading) to prepare a slurry with about a 25% solids concentration. The final slurry had a $D_{90}$ particle size between about 13 and about 18 microns.

Example 9: Oxidation Catalyst Article (Full-Size Inventive Article)

A full-size inventive oxidation catalyst article was prepared according to Example 8, except that the outlet zone top coat slurry alumina support contained both Mn (about 5% by weight) and yttrium (about 3% by weight).

Example 10: Engine Dyno Light-Off Testing of the Full-Size Articles

The full-size articles were canned, equipped with thermocouples, and then tested on an engine bench dyno. A standard steady-state light-off test was conducted with a pre-catalyst temperature between about 100° C. and about 380° C. after a pre-conditioning phase under lean conditions with a maximum pre-catalyst temperature of about 590° C. for about 10 minutes. The feed gas concentrations for the light-off test were. CO: about 120 to about 540 ppm; THC: about 50 to about 100 ppm; NO: about 50 to about 520 ppm; $NO_2$: about 5 to about 30 ppm; and $O_2$: about 8% to about 20%. NO conversion results for Examples 8 and 9 are provide in Table 13 below. Data in Table 13 demonstrate that the inventive Y-containing article provided enhanced $NO_2$/$NO_x$ performance, confirming the powder sample testing results (i.e., that adding Y to a Mn—Al support impregnated with Pt enhanced $NO_2$/$NO_x$ yield).

TABLE 13

$NO_2$/$NO_x$ Yield Results at 200° C., 250° C., and 300° C.

| Example # | $NO_2$/$NO_x$ yield at 200° C., % | $NO_2$/$NO_x$ yield at 250° C., % | $NO_2$/$NO_x$ yield at 300° C., % |
|---|---|---|---|
| Fresh (590° C. calcined brick) | | | |
| Example 7 (Reference Article) | 47 | 67 | 75 |
| Example 8 (Inventive Article) | 50 | 69 | 77 |
| Aged (800° C./16 hours/10% steam) | | | |
| Example 7 (Reference Article) | 15 | 37 | 46 |
| Example 8 (Inventive Article) | 17 | 41 | 50 |

What is claimed is:
1. An oxidation catalyst composition comprising:
a first platinum group metal (PGM) component;
a manganese (Mn) component;
a first refractory metal oxide support material; and
a metal component comprising yttrium, lanthanum, tin, magnesium, cerium, titanium, or a combination thereof,
wherein the first PGM component, the manganese component, and the metal component are supported on the first refractory metal oxide support material;
wherein the first PGM component is platinum or a combination of platinum and palladium;

wherein a molar ratio of yttrium to manganese is from about 0.1 to about 10.

2. The oxidation catalyst composition of claim 1, wherein the Mn component is present in an amount ranging from about 0.1% to about 10% by weight, based on the total weight of the composition and calculated as the oxide.

3. The oxidation catalyst composition of claim 1, wherein the Mn component is selected from a group consisting of MnO, $Mn_2O_3$, $MnO_2$, and combinations thereof.

4. The oxidation catalyst composition of claim 1, wherein the first PGM component is present in an amount ranging from about 0.1% to about 20% by weight, based on the weight of the composition.

5. The oxidation catalyst composition of claim 1, wherein: the first PGM component is a combination of platinum and palladium; and the ratio of platinum to palladium by weight is from about 20 to about 0.1.

6. The oxidation catalyst composition of claim 1, wherein the first refractory metal oxide support comprises alumina, silica, zirconia, titania, ceria, or a combination thereof.

7. The oxidation catalyst composition of claim 1, wherein the first refractory metal oxide support is selected from a group consisting of gamma alumina, silica doped alumina, ceria doped alumina, zirconia doped alumina, and titania doped alumina.

8. The oxidation catalyst composition of claim 1, wherein the first refractory metal oxide support is selected from gamma alumina and alumina doped with an amount ranging from about 1% to about 20% by weight of $SiO_2$.

9. The oxidation catalyst composition of claim 1, further comprising a first zeolite.

10. The oxidation catalyst composition of claim 9, wherein the first zeolite has a framework type selected from a group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

11. The oxidation catalyst composition of claim 9, wherein the first zeolite is ZSM-5, beta zeolite, mordenite, Y zeolite, chabazite, ferrierite, or a combination thereof.

12. A catalytic article comprising:
a substrate having an inlet end and an outlet end defining an overall length; and
a catalytic coating comprising one or more washcoats disposed on at least a portion of the overall length of the substrate, wherein at least one of said washcoats comprises an oxidation catalyst composition of claim 1.

13. The catalytic article of claim 12, wherein the catalytic coating comprises:
a first washcoat comprising an oxidation catalyst composition of claim 1 disposed on at least a portion of the overall length of the catalyst substrate; and
a second washcoat disposed on at least a portion of the overall length of the substrate, the second washcoat comprising:
a second PGM component supported on a second refractory metal oxide support material; and
a second zeolite,
wherein the oxidation catalyst composition comprising:
a first platinum group metal (PGM) component;
a manganese (Mn) component;
a first refractory metal oxide support material; and
a metal component comprising yttrium, lanthanum, tin, magnesium, cerium, titanium, or a combination thereof,
wherein the first PGM component, the manganese component, and the metal component are supported on the first refractory metal oxide support material;
wherein the first PGM component is platinum or a combination of platinum and palladium;
wherein a molar ratio of yttrium to manganese is from about 0.1 to about 10.

14. The catalytic article of claim 13, wherein the second zeolite has a framework type selected from a group consisting of AFI, AFR, AFS, AFY, ASV, ATO, ATS, BEA, BEC, BOG, BPH, BSV, CAN, CON, CZP, DFO, EMT, EON, EZT, FAU, GME, GON, IFR, ISV, ITG, IWR, IWS, IWV, IWW, JSR, LTF, LTL, MAZ, MEI, MOR, MOZ, MSE, MTW, NPO, OFF, OKO, OSI, RON, RWY, SAF, SAO, SBE, SBS, SBT, SEW, SFE, SFO, SFS, SFV, SOF, SOS, STO, SSF, SSY, USI, UWY, VET, and mixtures or intergrowths thereof.

15. The catalytic article of claim 13, wherein the second zeolite is ZSM-5, beta zeolite, mordenite, Y zeolite, chabazite, ferrierite, or a combination thereof.

16. The catalytic article of claim 13, wherein the second zeolite is beta zeolite, and the beta zeolite is promoted with iron in an amount ranging from about 0.5% to about 10% by weight, calculated as the oxide.

17. The catalytic article of claim 13, wherein the second PGM component is platinum or a combination of platinum and palladium, and the ratio of platinum to palladium by weight is from about 0.1 to about 20.

18. The catalytic article of claim 13, wherein the second refractory metal oxide support is selected from gamma alumina and alumina doped with from about 1% to about 20% by weight of $SiO_2$.

19. The catalytic article of claim 13, wherein the second washcoat is substantially free of a manganese component.

20. The catalytic article of claim 13, wherein the second washcoat is substantially free of any yttrium component.

21. The catalytic article of claim 13, wherein the second washcoat is disposed directly on the substrate, and the first washcoat is on at least a portion of the second washcoat.

22. The catalytic article of claim 13, wherein the first washcoat is disposed directly on the substrate, and the second washcoat is on at least a portion of the first washcoat.

23. The catalytic article of claim 13, wherein the catalytic article possesses a zoned configuration, the first washcoat is disposed on the catalyst substrate from the outlet end to a length from about 10% to about 80% of the overall length, and the second washcoat is disposed on the catalyst substrate from the inlet end to a length from about 30% to about 90% of the overall length.

24. The catalytic article of claim 13, further comprising a third washcoat comprising a third refractory metal oxide impregnated with a third PGM component comprising platinum and palladium.

25. The catalytic article of claim 24, wherein the third refractory metal oxide is gamma alumina or alumina doped with an amount ranging from about 1% to about 20% $SiO_2$.

26. The catalytic article of claim 24, wherein the third washcoat is disposed directly on the substrate, and the first and second washcoats are disposed on at least a portion of the third washcoat.

27. The catalytic article of claim 24, wherein the catalytic article possesses a zoned configuration, the third washcoat is disposed directly on the substrate, the first washcoat is disposed on the third washcoat from the outlet end to a length from about 10% to about 80% of the overall length, and the second washcoat is disposed on the third washcoat from the inlet end to a length from about 30% to about 90% of the overall length.

28. An exhaust gas treatment system comprising the catalytic article of claim 13, wherein the catalytic article is downstream of and in fluid communication with an internal combustion engine.

29. A method for treating an exhaust gas stream comprising hydrocarbons and/or carbon monoxide and/or $NO_x$, the method comprising passing the exhaust gas stream through the catalytic article of claim 13, or the exhaust gas treatment system of claim 28.

30. A method for treating an exhaust gas stream comprising hydrocarbons and/or carbon monoxide and/or $NO_x$, the method comprising passing the exhaust gas stream through the exhaust gas treatment system of claim 28.

31. An oxidation catalyst composition comprising:
a first platinum group metal (PGM) component;
a manganese (Mn) component;
a first refractory metal oxide support material; and
a metal component comprising yttrium or an oxide thereof,
wherein the first PGM component, the manganese component, and the metal component are supported on the first refractory metal oxide support material,
wherein the yttrium is present in an amount by weight ranging from about 0.5% to about 10%, based on the total weight of the composition and calculated as the oxide.

* * * * *